US012256302B2

(12) United States Patent
Vassilovski et al.

(10) Patent No.: US 12,256,302 B2
(45) Date of Patent: Mar. 18, 2025

(54) USER EQUIPMENT SIGNALING FOR VEHICLE ALERTING

(71) Applicant: QUALCOMM Incorporated, San Diego, CA (US)

(72) Inventors: Dan Vassilovski, Del Mar, CA (US); Gene Wesley Marsh, San Diego, CA (US); Gabi Sarkis, San Diego, CA (US); Hong Cheng, Basking Ridge, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 17/576,772

(22) Filed: Jan. 14, 2022

(65) Prior Publication Data
US 2023/0232199 A1 Jul. 20, 2023

(51) Int. Cl.
H04W 4/90 (2018.01)
H04W 4/02 (2018.01)
H04W 4/029 (2018.01)
H04W 4/12 (2009.01)
H04W 4/40 (2018.01)
H04W 76/14 (2018.01)
H04W 92/18 (2009.01)

(52) U.S. Cl.
CPC .......... H04W 4/90 (2018.02); H04W 4/026 (2013.01); H04W 4/027 (2013.01); H04W 4/029 (2018.02); H04W 4/12 (2013.01); H04W 4/40 (2018.02); H04W 76/14 (2018.02); H04W 92/18 (2013.01)

(58) Field of Classification Search
CPC .......... H04W 4/90; H04W 4/40; H04W 4/12; H04W 4/029; H04W 4/026; H04W 4/027; H04W 76/14
USPC ....................................... 455/404.1
See application file for complete search history.

(56) References Cited

U.S. PATENT DOCUMENTS

| 10,244,365 | B2* | 3/2019 | Meredith | H04B 1/3822 |
| 2016/0119897 | A1* | 4/2016 | Kim | H04M 1/72454 |
| | | | | 455/569.2 |
| 2022/0292974 | A1* | 9/2022 | Qi | G08G 1/205 |
| 2023/0239799 | A1* | 7/2023 | Chae | H04W 52/0225 |
| | | | | 370/311 |

* cited by examiner

Primary Examiner — Maria El-Zoobi
(74) Attorney, Agent, or Firm — Arun Swain

(57) ABSTRACT

Methods, systems, and devices for wireless communications are described. A user equipment (UE) may identify the UE is associated with a vehicle, such as being within the vehicle, or has established connectivity with the vehicle. The UE may transmit location information of the vehicle and one or more vehicle parameters to a network entity, such as a roadside unit (RSU) or a base station. The network entity may identify route data, safety data, or both. The network entity may transmit the route data, the safety data, or both to the UE.

30 Claims, 18 Drawing Sheets

USER EQUIPMENT SIGNALING FOR VEHICLE ALERTING

FIELD OF TECHNOLOGY

The following relates to wireless communications, including user equipment (UE) signaling for vehicle alerting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support user equipment (UE) signaling for vehicle alerting. Generally, the described techniques provide for a UE to transmit and receive cellular vehicle-to-everything (C-V2X) data. For example, a UE may be associated with a vehicle, such as being within a vehicle, or may established wired or wireless connectivity with the vehicle. In some cases, the UE may transmit a location of the vehicle and one or more static parameters, dynamic parameters, or both to a network entity. The network entity may be a base station, a roadside unit (RSU), or another network entity. The network entity may transmit a response message to the UE including route data, safety data, or both based on the vehicle information.

A method for wireless communication at a UE is described. The method may include identifying that the UE is associated with a vehicle or has established connectivity with the vehicle, transmitting, to a network entity via a communication link, a first message indicating a location of the vehicle and one or more vehicle parameters for the vehicle, and receiving, based on the location of the vehicle and the one or more vehicle parameters, a second message indicating route data, safety data, or both.

An apparatus for wireless communication at a UE is described. The apparatus may include a processor, memory coupled with the processor, and instructions stored in the memory. The instructions may be executable by the processor to cause the apparatus to identify that the UE is associated with a vehicle or has established connectivity with the vehicle, transmit, to a network entity via a communication link, a first message indicating a location of the vehicle and one or more vehicle parameters for the vehicle, and receive, based on the location of the vehicle and the one or more vehicle parameters, a second message indicating route data, safety data, or both.

Another apparatus for wireless communication at a UE is described. The apparatus may include means for identifying that the UE is associated with a vehicle or has established connectivity with the vehicle, means for transmitting, to a network entity via a communication link, a first message indicating a location of the vehicle and one or more vehicle parameters for the vehicle, and means for receiving, based on the location of the vehicle and the one or more vehicle parameters, a second message indicating route data, safety data, or both.

A non-transitory computer-readable medium storing code for wireless communication at a UE is described. The code may include instructions executable by a processor to identify that the UE is associated with a vehicle or has established connectivity with the vehicle, transmit, to a network entity via a communication link, a first message indicating a location of the vehicle and one or more vehicle parameters for the vehicle, and receive, based on the location of the vehicle and the one or more vehicle parameters, a second message indicating route data, safety data, or both.

Some examples of the method, apparatuses, and non-transitory computer-readable medium described herein may further include operations, features, means, or instructions for transmitting the first message based on detected motion of the vehicle by the UE.

Some examples of the method, apparatuses, and non-transitory computer-readable medium described herein may further include operations, features, means, or instructions for transmitting the first message based on wirelessly pairing of the UE with the vehicle, where establishing connectivity with the vehicle includes wirelessly pairing of the UE with the vehicle.

Some examples of the method, apparatuses, and non-transitory computer-readable medium described herein may further include operations, features, means, or instructions for transmitting the first message based on the UE establishing connectivity with the vehicle via a wired connection.

Some examples of the method, apparatuses, and non-transitory computer-readable medium described herein may further include operations, features, means, or instructions for transmitting the first message in response to user input indicating that the UE may be associated with the vehicle.

Some examples of the method, apparatuses, and non-transitory computer-readable medium described herein may further include operations, features, means, or instructions for transmitting a data request to the vehicle and receiving a data response message indicating at least one vehicle parameter of the one or more vehicle parameters.

Some examples of the method, apparatuses, and non-transitory computer-readable medium described herein may further include operations, features, means, or instructions for transmitting the first message indicating the one or more vehicle parameters that identifies one or more static characteristics of the vehicle, where the second message may be received based on the one or more static characteristics of the vehicle.

In some examples of the method, apparatuses, and non-transitory computer-readable medium described herein, the one or more static characteristics include a vehicle model, a vehicle size, a brake status, or a combination thereof.

Some examples of the method, apparatuses, and non-transitory computer-readable medium described herein may further include operations, features, means, or instructions for transmitting the first message indicating the one or more vehicle parameters that identifies one or more dynamic characteristics of the vehicle, where the second message may be received based on the one or more dynamic characteristics of the vehicle.

In some examples of the method, apparatuses, and non-transitory computer-readable medium described herein, the one or more dynamic characteristics include a speed of the vehicle, a yaw of the vehicle, a yaw rate of the vehicle, an engine status, or a combination thereof.

Some examples of the method, apparatuses, and non-transitory computer-readable medium described herein may further include operations, features, means, or instructions for determining, by the UE, the one or more vehicle parameters including a speed of the vehicle in at least one direction, an acceleration of the vehicle in at least one direction, a heading of the vehicle, a destination location of the vehicle, an intended route of the vehicle, or any combination thereof.

Some examples of the method, apparatuses, and non-transitory computer-readable medium described herein may further include operations, features, means, or instructions for receiving the second message indicating the safety data that identifies location information for one or more other vehicles, a traffic accident, a reduced traffic speed, a collision alert, a status of one or more components of the vehicle, or any combination thereof.

Some examples of the method, apparatuses, and non-transitory computer-readable medium described herein may further include operations, features, means, or instructions for receiving the second message indicating the route data that identifies one or more of a map, a speed limit, a road construction alert, road congestion, an alternate route, a road topology, or any combination thereof.

Some examples of the method, apparatuses, and non-transitory computer-readable medium described herein may further include operations, features, means, or instructions for receiving, from the network entity, control signaling indicating a location positioning protocol configuration for reporting, via the communication link, one or more information elements in accordance with a location positioning protocol, where the communication link may be a sidelink or an access link, and where transmitting the first message includes and transmitting, via the sidelink or the access link, the one or more information elements in accordance with the location positioning protocol configuration, the one or more information elements indicating the location of the vehicle, the one or more vehicle parameters for the vehicle, or both.

In some examples of the method, apparatuses, and non-transitory computer-readable medium described herein, the network entity may be a base station or a road side unit.

Some examples of the method, apparatuses, and non-transitory computer-readable medium described herein may further include operations, features, means, or instructions for receiving the second message via a sidelink or an access link.

A method for wireless communication at a network entity is described. The method may include receiving, from a UE, a message indicating one or more vehicle parameters for a vehicle associated with the UE and a location of the vehicle, identifying route data, safety data, or both, based on the location of the vehicle and the one or more vehicle parameters, and transmitting, to the UE, a response message including the route data, the safety data, or both.

An apparatus for wireless communication at a network entity is described. The apparatus may include a processor, memory coupled with the processor, and instructions stored in the memory. The instructions may be executable by the processor to cause the apparatus to receive, from a UE, a message indicating one or more vehicle parameters for a vehicle associated with the UE and a location of the vehicle, identify route data, safety data, or both, based on the location of the vehicle and the one or more vehicle parameters, and transmit, to the UE, a response message including the route data, the safety data, or both.

Another apparatus for wireless communication at a network entity is described. The apparatus may include means for receiving, from a UE, a message indicating one or more vehicle parameters for a vehicle associated with the UE and a location of the vehicle, means for identifying route data, safety data, or both, based on the location of the vehicle and the one or more vehicle parameters, and means for transmitting, to the UE, a response message including the route data, the safety data, or both.

A non-transitory computer-readable medium storing code for wireless communication at a network entity is described. The code may include instructions executable by a processor to receive, from a UE, a message indicating one or more vehicle parameters for a vehicle associated with the UE and a location of the vehicle, identify route data, safety data, or both, based on the location of the vehicle and the one or more vehicle parameters, and transmit, to the UE, a response message including the route data, the safety data, or both.

Some examples of the method, apparatuses, and non-transitory computer-readable medium described herein may further include operations, features, means, or instructions for receiving the message indicating the one or more vehicle parameters that identifies one or more static characteristics of the vehicle, where the response message may be transmitted based on the one or more static characteristics of the vehicle.

In some examples of the method, apparatuses, and non-transitory computer-readable medium described herein, the one or more static characteristics include a vehicle model, a vehicle size, a brake status, or a combination thereof.

Some examples of the method, apparatuses, and non-transitory computer-readable medium described herein may further include operations, features, means, or instructions for receiving the message indicating the one or more vehicle parameters that identifies one or more dynamic characteristics of the vehicle, where the response message may be transmitted based on the one or more dynamic characteristics of the vehicle.

In some examples of the method, apparatuses, and non-transitory computer-readable medium described herein, the one or more dynamic characteristics include a speed of the vehicle, a yaw of the vehicle, a yaw rate of the vehicle, an engine status, or a combination thereof.

In some examples of the method, apparatuses, and non-transitory computer-readable medium described herein, the message indicates that the UE determined the one or more vehicle parameters including a speed of the vehicle in at least one direction, an acceleration of the vehicle in at least one direction, a heading of the vehicle, a destination location of the vehicle, an intended route of the vehicle, or any combination thereof.

Some examples of the method, apparatuses, and non-transitory computer-readable medium described herein may further include operations, features, means, or instructions for transmitting the response message indicating the safety data that identifies location information for one or more other vehicles, a traffic accident, a reduced traffic speed, a collision alert, a status of one or more components of the vehicle, or any combination thereof.

Some examples of the method, apparatuses, and non-transitory computer-readable medium described herein may further include operations, features, means, or instructions for transmitting the response message indicating the route data that identifies one or more of a map, a speed limit, a road construction alert, road congestion, an alternate route, a road topology, or any combination thereof.

Some examples of the method, apparatuses, and non-transitory computer-readable medium described herein may further include operations, features, means, or instructions for transmitting, to the UE, control signaling indicating a location positioning protocol configuration for reporting, via a sidelink or an access link, one or more information elements in accordance with a location positioning protocol, where receiving the message includes and receiving, via the sidelink or the access link, the one or more information elements in accordance with the location positioning protocol configuration, the one or more information elements indicating the location of the vehicle, the one or more vehicle parameters for the vehicle, or both.

Some examples of the method, apparatuses, and non-transitory computer-readable medium described herein may further include operations, features, means, or instructions for transmitting the response message to a road side unit, the response message instructing the road side unit to forward the route data, the safety data, or both, to the UE.

In some examples of the method, apparatuses, and non-transitory computer-readable medium described herein, the network entity may be a base station or a road side unit.

Some examples of the method, apparatuses, and non-transitory computer-readable medium described herein may further include operations, features, means, or instructions for transmitting the response message via a sidelink or an access link.

DETAILED DESCRIPTION

Figure 1:
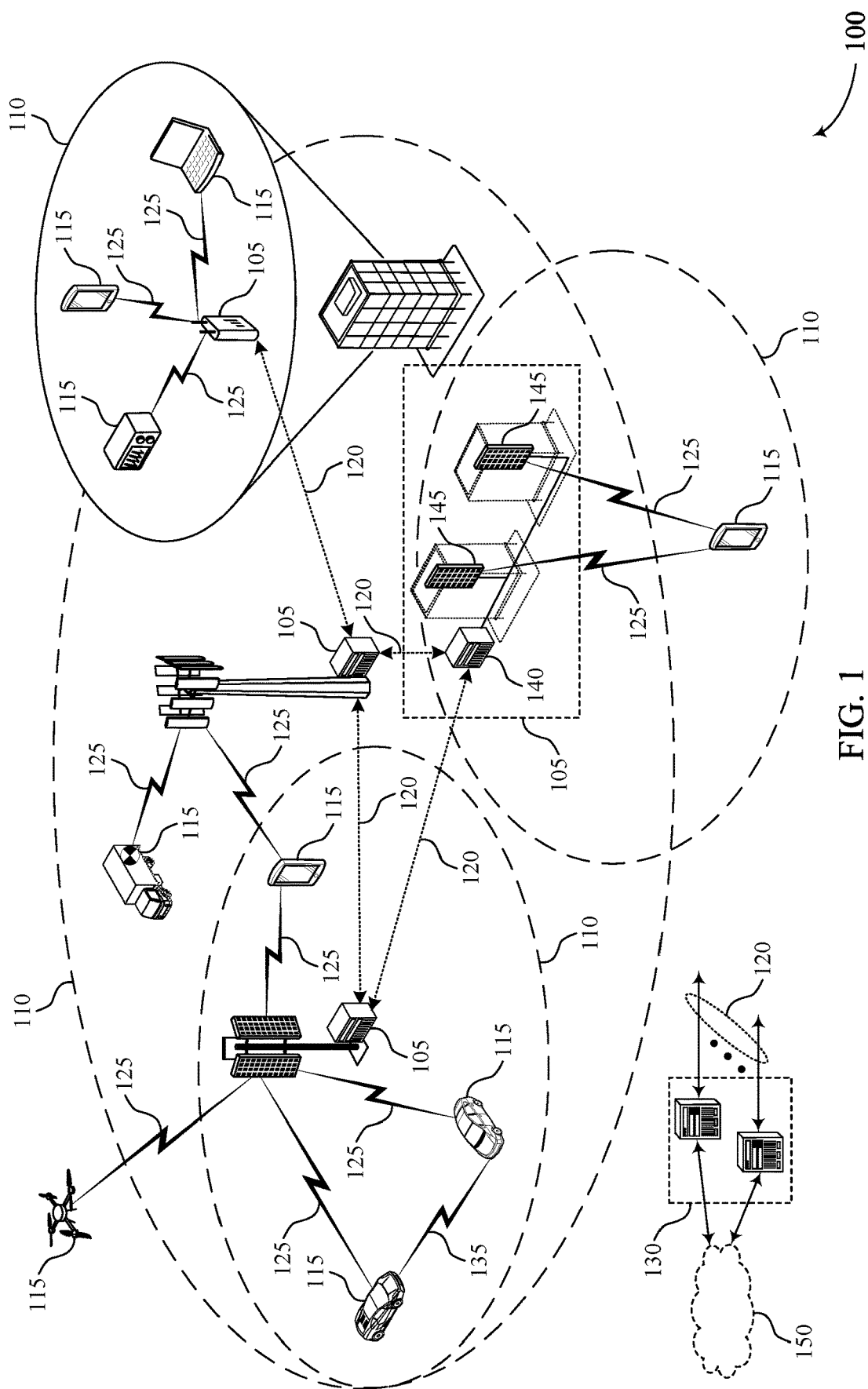
FIGS. 1 and 2 illustrate examples of wireless communications systems that support user equipment (UE) signaling for vehicle alerting in accordance with aspects of the present disclosure.

In some wireless communications systems, one or more wireless devices, including vehicles, may be capable of cellular-vehicle-to-everything (C-V2X) communication. For example, the vehicles may exchange basic safety messages (BSMs) (e.g., vehicle location, motion state, and vehicle status) and advanced features (e.g., dissemination of detected vehicle, vehicle roadside units (RSUs), and obstacle characteristics through sensor sharing, vehicle maneuver planning information, and accurate positioning). For the foreseeable future, the majority of vehicles may not be C-V2X-capable, and therefore unable to exploit information provided by other vehicles or infrastructure-based RSUs. However, a user often takes their user equipment (UE), such as a cellphone, into a vehicle while traveling in the vehicle. Thus, a user's UE may be used to provide C-V2X functionality for the vehicle that lacks such capability. In some examples, the user's UE may be used to provide the vehicle connectivity via a cellular connection (e.g., Uu connection) in addition to, or in place of C-V2X connectivity. One or more UEs, such as a cellular device of a user of a vehicle, may determine if the user is engaged in driving, either through wireless or wired connection to a vehicle-based application, or by determining motion state. In some cases, vehicle-based UEs may have knowledge of user intended activity, including route, destination, and intermediate stops through 3rd-party applications such as mapping applications. The UE-based information, along with information provided to the UEs from the vehicle may provide a comprehensive set of location, motion state, destination, and route information for the vehicles. In some examples, a vehicle may not be capable of C-V2X communication, and therefore may be unable to exploit information provided by other vehicles or infrastructure-based RSUs.

In some examples, providing a mechanism to enable UEs used in vehicles to communicate (e.g., receive and/or transmit) C-V2X-based data may improve driving experience for both non-C-V2X and C-V2X-capable vehicles. In some cases, one or more UEs may directly transmit and receive information based on user input (e.g., mapping application destination or route), cellphone-detected parameters (e.g., location, speed, heading, acceleration), and vehicle-provided input (e.g., model, size, on-board diagnostics (OBD) inputs). For example, UEs capable of PC5 communications, which may be an example of UE to UE communications, may directly transmit and receive the information from other PC5-capable UEs. Similarly, non-PC5-capable UEs may exchange data with a base station (e.g., over a Uu link) via the introduction of an interworking function (IWF) in the cellular network interfacing to RSUs. In some cases, a UE may be within a vehicle, and the UE may identify based on motion or location that the UE is within the vehicle. Additionally, or alternatively, the UE may establish connectivity with the vehicle, such as a wired connection or a wireless connection. The UE may transmit a message indicating a location of the vehicle and vehicle parameters to a network entity, such as a base station. In some cases, the UE may receive one or more messages indicating route data, safety data, or both.

Particular aspects of the subject matter described in this disclosure may be implemented to realize one or more of the following potential advantages. The techniques employed by the described communication devices may provide benefits and enhancements to the operation of the communication devices. For example, techniques may provide for UEs associated with vehicles to communicate (e.g., receive and/or transmit), with a network entity (e.g., a base station or a RSU), data relating to vehicle location, vehicle parameters, and/or other vehicle related information. Communicating such data via a communication link with the network entity may allow the UE to receive routing data, safety data, or both via the network instead of, or in addition to, vehicles directly exchanging data. In this way, UEs (e.g., via the associated vehicle) may take advantage of the routing data, safety data, or both to improve the driving experience and safety (e.g., by changing speed, route, etc.) for vehicles. In some other examples, techniques may provide for a network entity to identify route data, safety data, or both based on information collected by a UE. The vehicle may use the route data, safety data, or both to prevent collisions, reroute, or the like. In some implementations, operations performed by the described communication devices may also support improvements to power consumption by streamlining the route data and safety data communication between the UE and the vehicle (e.g., by providing specific IEs to exchange such data), or improvements to reliability for communications by using a UE for transmitting and receiving data. In some cases, improvements in spectral efficiency, data rates, and, in some examples, latency may be supported by a network entity coordinating transmissions to and from a UE in connection with a vehicle and other communications, among other benefits.

Aspects of the disclosure are initially described in the context of wireless communications systems. Aspects of the disclosure are further described in the context of vehicle diagrams and process flows. Aspects of the disclosure are further illustrated by and described with reference to apparatus diagrams, system diagrams, and flowcharts that relate to UE signaling for vehicle alerting.

FIG. 1 illustrates an example of a wireless communications system 100 that supports UE signaling for vehicle alerting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, an on-board diagnostic (OBD) device, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may be capable of determining if a user of the UE 115 is engaged in driving. The UE 115 may determine the user is driving based on a wireless or wired connection with a vehicle via a vehicle-based application or based on a motion state. In some cases, a vehicle-based UE 115 may have knowledge of user intended activity, including route, destination and intermediate stops through third-party applications such as mapping applications. The information from the UE 115, along with information provided to the UE 115 from the vehicle, may provide a comprehensive set of location, motion state, destination and route information for the vehicles. In some examples, if a vehicle is not capable of C-V2X communication, the vehicle may be unable to exploit information provided by other vehicles or RSUs.

A UE 115 in a vehicle may communicate (e.g., receive and/or transmit) C-V2X data to improve driving experience for both non-C-V2X and C-V2X vehicles. In some cases, the UE 115 may be capable of PC5 communication and may directly transmit and receive information based on user input (e.g., mapping application destination or route), cellphone-detected parameters (e.g., location, speed, heading, acceleration, or the like), and vehicle-provided input (e.g., model, size, on-board diagnostics (ODB) inputs, or the like), which is described in further detail with respect to FIG. 3. In some other cases, the UE 115 may be non-PC5-capable and may exchange data over a Uu link with a base station 105 via the introduction of an IWF in the cellular network interfacing to RSUs, which is described in further detail with respect to FIG. 4.

In some examples, UE 115-a may determine a vehicle location of the vehicle and one or more vehicle parameters of the vehicle. The UE 115 may transmit one or more uplink messages including the vehicle location and vehicle parameters to a base station 105, an RSU, or both. In some cases, the UE 115 may initiate the uplink messages based on detecting vehicle pairing, detecting vehicle motion, user invocation, or a combination thereof. In some examples, the base station 105, the RSU, or both may determine one or more of route data and safety data. The base station 105, the RSU, or both may transmit a downlink message to the UE 115 including the route data, safety data, or both.

Figure 2:
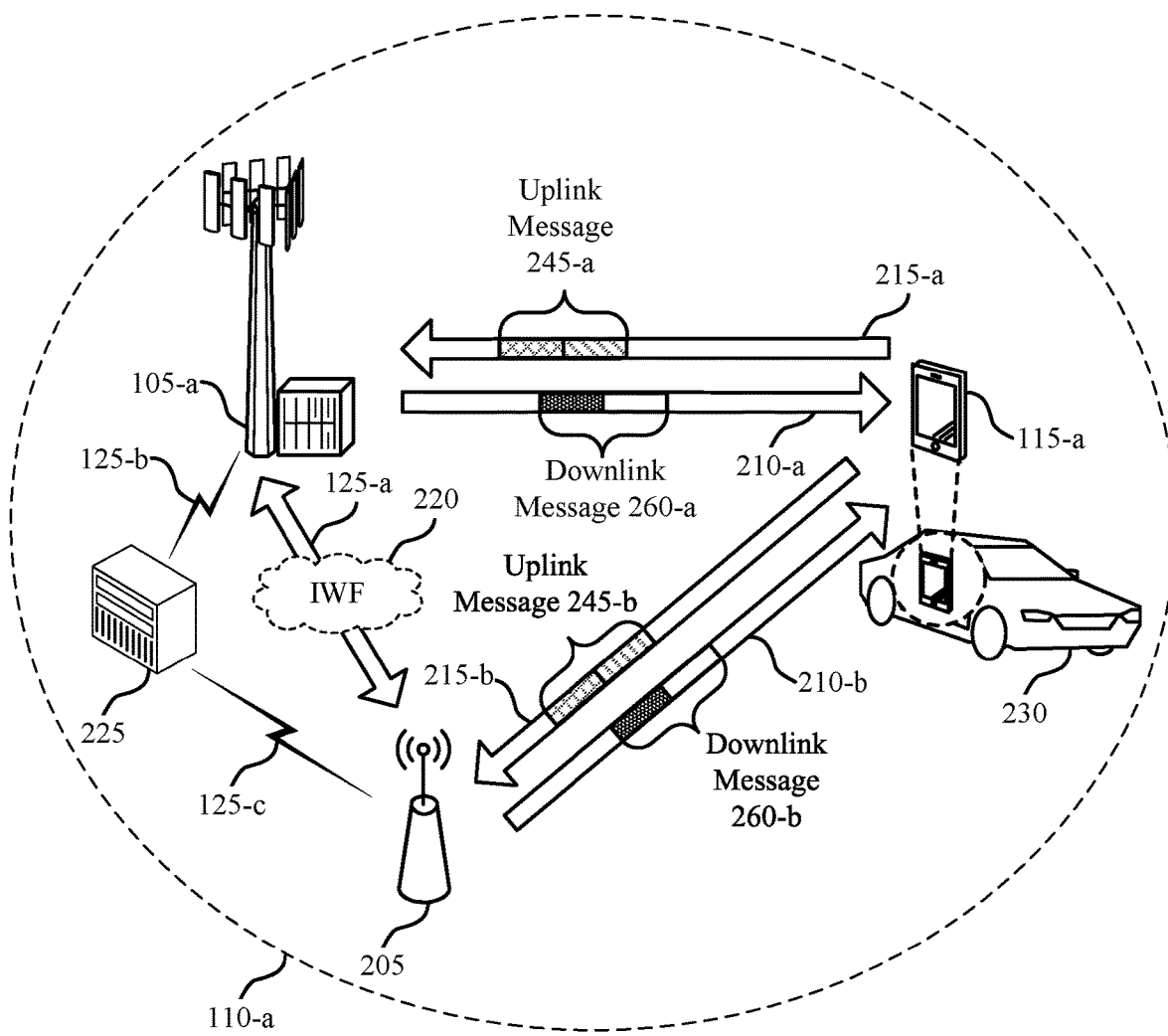

FIG. 2 illustrates an example of a wireless communications system 200 that supports UE signaling for vehicle alerting in accordance with aspects of the present disclosure. In some examples, wireless communications system 200 may implement aspects of wireless communications system 100 and may include a UE 115-a and a base station 105-a with a coverage area 110-a, which may be examples of a UE 115 and a base station 105 with a coverage area 110 as described with reference to FIG. 1. In some examples, base station 105-a, an RSU 205, or both and UE 115-a may communicate control information, data, or both using a downlink communication link 210, such as downlink communication link 210-a and downlink communication link 210-b, respectively. Similarly, UE 115-a may communicate control information, data, or both with base station 105-a, the RSU 205, or both using an uplink communication link 215, such as uplink communication link 215-a and uplink communication link 215-b, respectively.

In some cases, the RSU 205 may act as a base station 105. Additionally, or alternatively, the RSU 205 may relay information from a UE 115 to a base station 105. For example, the RSU 205 may relay information from UE 115-a to base station 105-a via communication link 125-a, which may be an example of a communication link 125 as described with reference to FIG. 1. The RSU 205 may relay information using an internetwork function (IWF) 220, which may act as a gateway to enable different RAN network components to communicate.

In some examples, the RSU 205 and base station 105-a may be in communication with a location positioning protocol (LPP) server 225. For example, base station 105-a may access LPP server 225 via communication link 125-b, and the RSU 205 may access LPP server 225 via communication link 125-c, where communication link 125-b and communication link 125-c may be examples of communication links 125 as described with reference to FIG. 1. The LPP server 225 may implement an LPP, which may be a point-to-point protocol providing multiple connections to different devices in wireless communications system 200. Base station 105-a, the RSU 205, or both may access the LPP server 225 to provide route information, safety information, or both to vehicles in a V2X system.

In some examples, a vehicle 230 may be C-V2X capable. For example, the vehicle 230 may transmit and receive messages, such as BSMs and advanced features, over a sidelink connection (e.g., PC5). Basic safety may include vehicle location, motion state, vehicle status, or a combination thereof. Advanced features may include dissemination of a detected vehicle, vulnerable road users (VRUs) and obstacle characteristics through sensor sharing, vehicle maneuver planning information through maneuver sharing messages, accurate positioning, or a combination thereof.

Additionally, or alternatively, a UE 115 may be capable of determining if a user of the UE 115 is engaged in driving. The UE 115 may determine the user is driving based on a wireless or wired connection with a vehicle 230 via a vehicle-based application (e.g., Android Auto) or based on a motion state. For example, a UE 115 may be plugged into a port (e.g., USB port) of the vehicle, may be connected via Bluetooth, or the like. In some cases, a vehicle-based UE 115 may have knowledge of user intended activity, including route, destination and intermediate stops through third-party applications such as mapping applications. The information from the UE 115, along with information provided to the UE 115 from the vehicle 230, may provide a comprehensive set of location, motion state, destination and route information for the vehicles 230.

In some examples, if a vehicle 230 is not capable of C-V2X communication, the vehicle 230 may be unable to exploit information provided by other vehicles 230 or RSUs 205. Thus, a UE 115 in a vehicle 230 may communicate (e.g., receive and/or transmit) C-V2X data to improve driving experience for both non-C-V2X and C-V2X vehicles 230. In some examples, the UE 115 in the vehicle 230 may be used to provide connectivity via a cellular connection (e.g., Uu connection) with base station 105-*a* in addition to, or in place of C-V2X connectivity. For example, UE 115-*a* may be located within a vehicle 230. UE 115-*a* may determine information related to the vehicle 230 based on collecting the data via a third-party application or a connection with the vehicle 230 or based on requesting the data from the vehicle 230. In some cases, UE 115-*a* may be capable of PC5 communication and may directly transmit and receive information based on user input (e.g., mapping application destination or route), cellphone-detected parameters (e.g., location, speed, heading, acceleration, or the like), and vehicle-provided input (e.g., model, size, on-board diagnostics (ODB) inputs, or the like), which is described in further detail with respect to FIG. 3. In some other cases, UE 115-*a* may be non-PC5-capable and may exchange data over a Uu link with base station 105-*a* via the introduction of an IWF 220 in the cellular network interfacing to RSUs 205, which is described in further detail with respect to FIG. 4.

In some examples, UE 115-*a* may determine a vehicle location 235 of the vehicle 230 based on the third-party application or connection with the vehicle 230. For example, UE 115-*a* may use a mapping service to determine the vehicle location 235. In some other examples, UE 115-*a* may be paired (e.g., via Bluetooth or Wi-Fi) with the vehicle 230 or via a wired connection (e.g., via a universal serial bus (USB) connection), and may receive location information from the vehicle 230 via the connection. UE 115-*a* may determine one or more vehicle parameters 240 of the vehicle 230. The vehicle parameters 240 may include vehicle characteristics and may be provided to UE 115-*a* via a connection with the vehicle 230. In some cases, the vehicle characteristics may be static characteristics, such as vehicle model, vehicle size, brake status, or the like. Additionally, or alternatively, the vehicle characteristics may be dynamic characteristics, such as speed, yaw, engine status, or the like. The static and dynamic characteristics may be a subset of, or up to all of, a set of C-V2X BSMs. The vehicle characteristics may also include UE-determined vehicle characteristics, such as vehicle location 235, speed, acceleration, heading, destination, intended route, or a combination thereof. UE 115-*a* may obtain some of the vehicle characteristics, such as destination, intended route, or the like, from one or more 3rd-party applications operating on the vehicle or UE 115-*a*, via a vehicle radio frequency network, or the like.

In some cases, if UE 115-*a* is not paired with the vehicle 230 (e.g., located within the vehicle 230, but not connected wired or wirelessly to the vehicle 230), UE 115-*a* may determine vehicle location 235, speed, acceleration, heading, destination, intended route, or a combination thereof. UE 115-*a* may obtain some of the vehicle characteristics, such as destination, intended route, or the like, from one or more 3rd-party applications operating on the UE 115-*a*. UE 115-*a* may transmit uplink message 245-*a* including the vehicle location 235 and vehicle parameters 240 to base station 105-*a* via uplink communication link 215-*a* (e.g., a Uu connection). Additionally, or alternatively, UE 115-*a* may transmit uplink message 245-*b* to an RSU 205 including the vehicle location 235 and the vehicle parameters 240 (e.g., via a PC5 connection). In some cases, UE 115-*a* may initiate a vehicle status transmission (e.g., uplink message 245-*a*, uplink message 245-*b*, or both) based on detecting pairing of the UE 115-*a* with vehicle 220 (e.g., establishing wireless connection between the UE 115-*a* and vehicle 220 via a wireless connection), detecting vehicle motion, user invocation input at UE 115-*a*, or a combination thereof.

The RSU may relay uplink message 245-*b* to base station 105-*a* via wireless communication link 125-*a* and using the IWF 220. The IWF 220 may be a logical entity that translates messages between an access link format (e.g., a Uu format) and a sidelink format (e.g., a PC5 format) to enable coordination between UE 115-*a*, base station 105-*a*, and RSU 205.

In some examples, the RSU 205, base station 105-*a*, or both may transmit control signaling to UE 115-*a* indicating an LPP configuration for reporting information elements (IEs) in accordance with an LPP. An IE may be a structural element of LPP signaling including one or more fields, where each field is associated with a configuration parameter for an LPP configuration. The LPP configuration may include parameters associated with communicating, measuring, or reporting positioning information. For example, RSU 205, base station 105-*a*, or both, may transmit a request to the UE 115-*a* reporting its location determining capabilities (e.g., measurement, GPS, triangulation, response time, accuracy, timing offset, etc.). The RSU 205, base station 105-*a*, or both may determine the LPP configuration based on accessing the LPP server 225 and the reported UE capabilities. UE 115-*a* may transmit uplink message 245-*a* (e.g., via a Uu or access link), uplink message 245-*b* (e.g., via a PC5 or sidelink), or both using the IEs and according to the LPP configuration. For example, the RSU 205, base station 105-*a*, or both, may configure the UE 115-*a* with a resource for measuring a positioning reference signal. The UE 115-*a* may monitor and measure the indicated resource in accordance with the LPP configuration, and may transmit a report that includes the measured positioning reference signal (e.g., in an information element) to the RSU 205, base station 105-*a*, or both. For example, the LPP configuration may configure the UE 115-*a* with a table that includes a set of indexes each corresponding to a different measurement level, distance, or both, and the UE 115-*a* may report an information element including one of the indexes based on the measured positioning reference signal in accordance with the LPP configuration.

In some examples, for VRU alerting, the IWF 220 may determine current and expected vehicles 230 along a VRU route presenting a hazard. The IWF 220 may incorporate received static vehicle parameters, dynamic vehicle parameters, or both. The IWF 220 may input the vehicle parameters 240 to a C-V2X network. The vehicle parameters may include UE provided vehicle characteristics (e.g., static, dynamic, or both), characteristics provided by a UE at a VRU, or both. The IWF 220 may additionally input an identified VRU, vehicular hazards, or the like.

In some examples, base station 105-*a*, RSU 205, or both may determine one or more of route data 250 and safety data 255. For example, base station 105-*a*, RSU 205, or both may use the vehicle location 235 and vehicle parameters 240 to identify route data 250, such as road topology, road and traffic conditions, or the like. Road topology may include maps, speed limits, imagery (e.g., sidewalks, shoulders, restricted visibility), and the like. Traffic conditions may include traffic cams, traffic patterns third-party mapping applications input, RSU input, V2X vehicle input, and the like. Road conditions may include repairs, accidents, detours, traffic cams, repair logs, third-party mapping applications input, RSU input, V2X vehicle input, and the like.

Additionally, or alternatively, a network entity (e.g., base station 105-a, RSU 205, or both) may use the vehicle location 235 and one or more vehicle parameters 240 to identify safety data 255, such as vehicular hazards (e.g., potentially hazards engine or brake statuses), VRUs, or the like. The network entity may be within a cellular network including base station 105-a or separate from (e.g., coupled with via one or more nodes) the cellular network. Base station 105-a may transmit downlink message 260-a to UE 115-a including the route data 250, safety data 255, or both. Similarly, RSU 205 may transmit downlink message 260-b to UE 115-a including the route data 250, safety data 255, or both.

Figure 3:
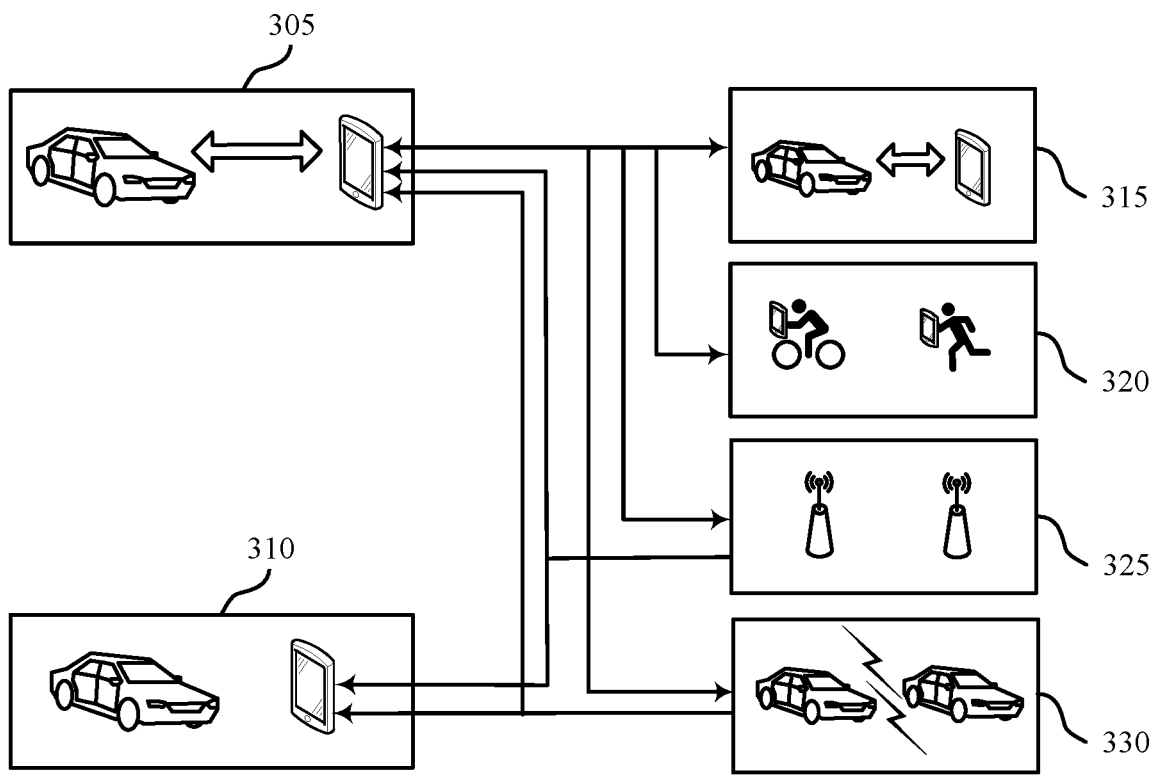
FIGS. 3 and 4 illustrate examples of vehicle diagrams that support UE signaling for vehicle alerting in accordance with aspects of the present disclosure.

FIG. 3 illustrates an example of a vehicle diagram 300 that supports UE signaling for vehicle alerting in accordance with aspects of the present disclosure. In some examples, vehicle diagram 300 may implement aspects of wireless communications system 100 and wireless communications system 200. For example, as illustrated in vehicle diagram 300, a vehicle paired UE 305 and a non-vehicle paired UE 310 may communicate vehicle parameters and location via PC5 connections to obtain route data, safety data, or both in a C-V2X system.

In some examples, a vehicle paired UE 305 may be paired wirelessly or via a wired connection with a vehicle, as described with reference to FIG. 2 (e.g., via USB, Bluetooth, Wi-Fi, or the like). The vehicle paired UE 305 may determine vehicle characteristics provided to the vehicle paired UE 305, such as static characteristics, dynamic characteristics, or both. Additionally, or alternatively, the vehicle paired UE 305 may determine vehicle characteristics independent of the vehicle (e.g., via a third-party application). In some other examples, a non-vehicle paired UE 310 may determine the vehicle characteristics independent of the vehicle (e.g., rather than vehicle characteristics provided by the vehicle).

The vehicle paired UE 305, the non-vehicle paired UE 310, or both may communicate the vehicle parameters and a location of the vehicle (e.g., vehicle information) to another PC5 capable UE 315, a VRU mounted PC5 capable UE 320, one or more RSUs 325, one or more C-V2X capable vehicles 330, or a combination thereof via one or more PC5 links 335. For example, the vehicle paired UE 305, the non-vehicle paired UE 310, or both may communicate the vehicle information based on detecting vehicle pairing, detecting vehicular motion, or user invocation.

The PC5 capable UE 315, VRU mounted PC5 capable UE 320, RSUs 325, C-V2X capable vehicles 330, or a combination thereof may use the vehicle information to perform route modification, safety maneuvers, or the like. The RSUs 325 and C-V2X capable vehicles 330 may generate data (e.g., the C-V2X capable vehicles 330 may generate a BSM), advanced features (e.g., sensor sharing, maneuver sharing, or the like), or both, and may send the data to the vehicle paired UE 305, the non-vehicle paired UE 310, or both.

Figure 4:
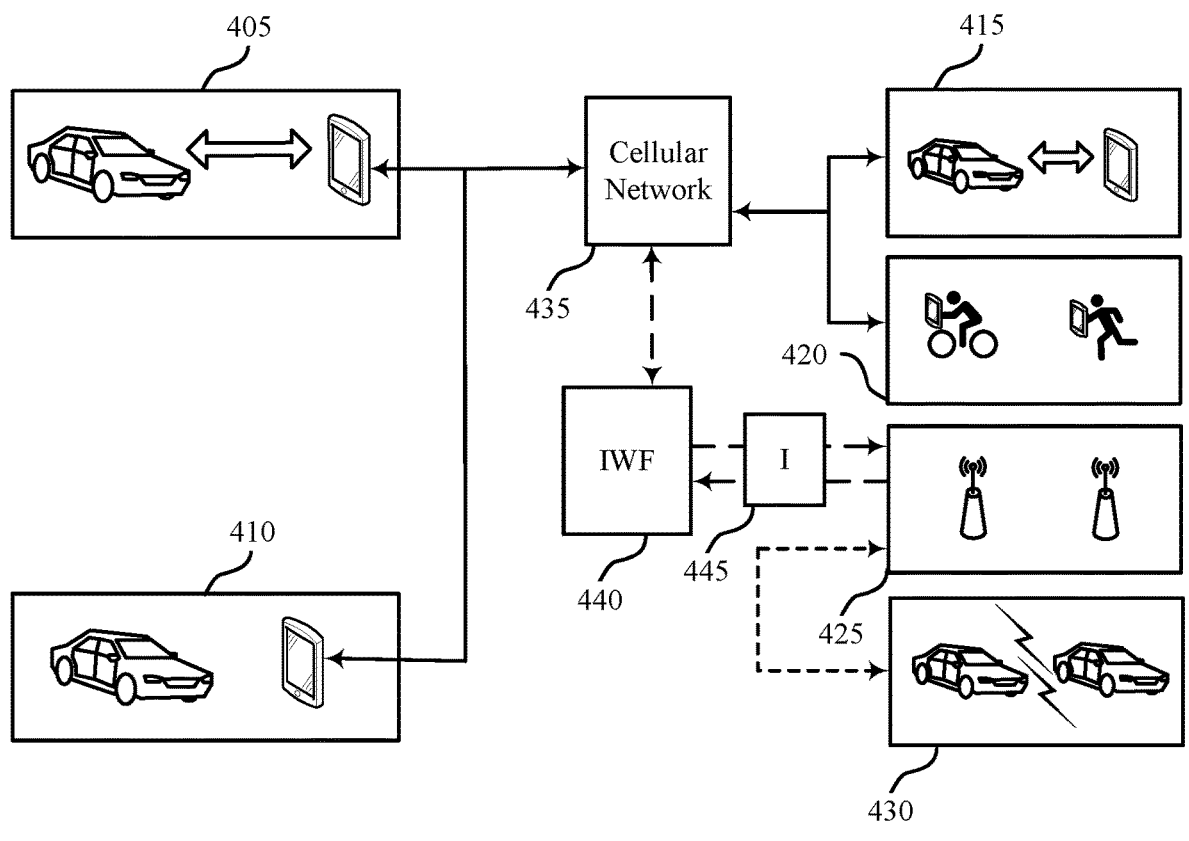

FIG. 4 illustrates an example of a vehicle diagram 400 that supports UE signaling for vehicle alerting in accordance with aspects of the present disclosure. In some examples, vehicle diagram 400 may implement aspects of wireless communications system 100, wireless communications system 200, and vehicle diagram 300. For example, as illustrated in vehicle diagram 400, a vehicle paired UE 405 and a non-vehicle paired UE 410 may communicate vehicle parameters and location via Uu connections to obtain route data, safety data, or both in a C-V2X system.

In some examples, a vehicle paired UE 405 may be paired wirelessly or via a wired connection with a vehicle, as described with reference to FIGS. 2 and 3 (e.g., via USB, Bluetooth, Wi-Fi, or the like). The vehicle paired UE 405 may determine vehicle characteristics provided to the vehicle paired UE 405, such as static characteristics, dynamic characteristics, or both. Additionally, or alternatively, the vehicle paired UE 405 may determine vehicle characteristics independent of the vehicle (e.g., via a third-party application). In some other examples, a non-vehicle paired UE 410 may determine the vehicle characteristics independent of the vehicle (e.g., rather than vehicle characteristics provided by the vehicle).

The vehicle paired UE 405, the non-vehicle paired UE 410, or both may communicate the vehicle parameters and a location of the vehicle (e.g., vehicle information) to another Uu capable UE 415, a VRU mounted Uu capable UE 420, one or more RSUs 425, one or more C-V2X capable vehicles 430, or a combination thereof via one or more Uu links 450. For example, the vehicle paired UE 405, the non-vehicle paired UE 410, or both may communicate the vehicle information based on detecting vehicle pairing, detecting vehicular motion, or user invocation. The vehicle paired UE 405, the non-vehicle paired UE 410, or both may transmit the vehicle information to the Uu capable UE 415, VRU mounted Uu capable UE 420, RSUs 425, C-V2X capable vehicles 430, or a combination thereof via a cellular network 435.

The cellular network 435 may implement an IWF 440 to relay information to and from one or more RSUs 425, C-V2X capable vehicles 430, or both via one or more communication links 460. For example, the cellular network 435 may use the IWF 440 for VRU alerting and inputting information to a C-V2X network, as described with reference to FIG. 2. Additionally, or alternatively, a network entity (e.g., an entity within the cellular network 435 or an entity separate from but coupled with the cellular network 435) may use a third-party mapping application or entity to determine destination, route, expected speed, activity type, traffic conditions, other vehicles, VRUs, road impairments, road work, and the like. The IWF may communicate with the one or more RSUs 425 via an interface (I) 445 on the one or more communication links 460.

The Uu capable UE 415, VRU mounted Uu capable UE 420, RSUs 425, C-V2X capable vehicles 430, or a combination thereof may use the vehicle information to perform route modification, safety maneuvers, or the like. The RSUs 425 and C-V2X capable vehicles 440 may communicate with each other via a PC5 link 455. The RSUs 425 and C-V2X capable vehicles 430 may generate data (e.g., the C-V2X capable vehicles 430 may generate a BSM), advanced features (e.g., sensor sharing, maneuver sharing, or the like), or both, and may send the data to the vehicle paired UE 405, the non-vehicle paired UE 410, or both via the cellular network 435. For example, the C-V2X capable vehicles 430 may exchange information with RSUs 425 via a PC5 link 455. The RSUs 425 may communicate with a cellular network 435 via one or more communication links 460 between an IWF 440 and I 445.

Figure 5:
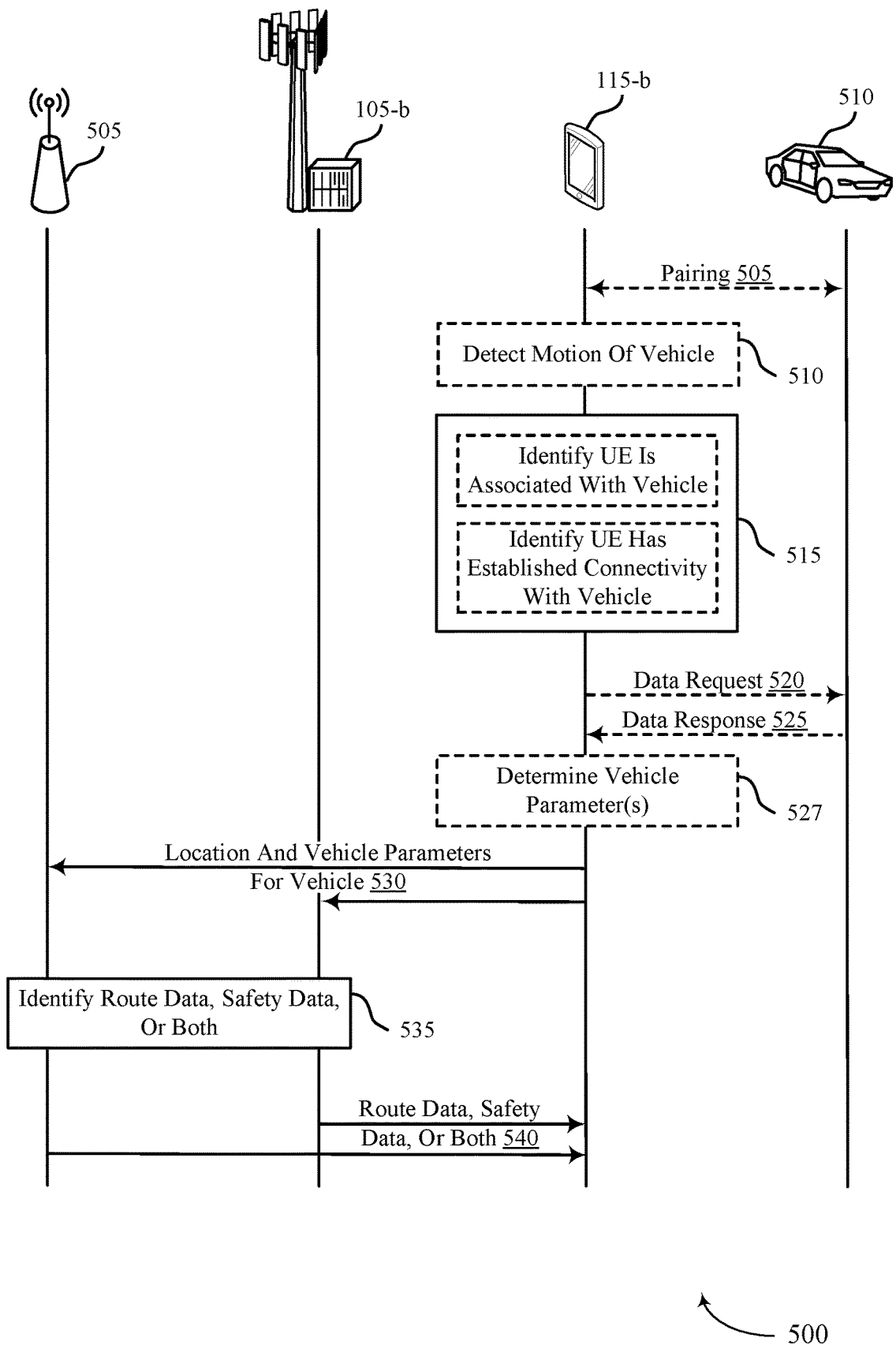
FIG. 5 illustrates an example of a process flow that supports UE signaling for vehicle alerting in accordance with aspects of the present disclosure.

FIG. 5 illustrates an example of a process flow 500 that supports UE signaling for vehicle alerting in accordance with aspects of the present disclosure. In some examples, process flow 500 may implement aspects of wireless communications system 100, wireless communications system 200, vehicle diagram 300, and vehicle diagram 400. The process flow 500 may illustrate an example of a UE 115-*b* communicating vehicle information with a base station 105-*b*, RSU 505, or both to obtain route data, safety data, or both. Base station 105-*b*, RSU 505, UE 115-*b*, and vehicle 510 may be examples of a base station 105, an RSU 205, a UE 115, and a vehicle 230 as described with reference to FIGS. 1 and 2. Alternative examples of the following may be implemented, where some processes are performed in a different order than described or are not performed. In some cases, processes may include additional features not mentioned below, or further processes may be added.

At 505, UE 115-*b* may pair with a vehicle 510. For example, UE 115-*b* may wirelessly pair with the vehicle (e.g., via Bluetooth or Wi-Fi). In some other examples, UE 115-*b* may be paired by a user via a wired connection, such as a USB connection or an on-board diagnostic (OBD) port. UE 115-*b* may be located within the vehicle. In some cases, UE 115-*b* may not be paired with the vehicle 510.

At 510, UE 115-*b* may detect motion of the vehicle 510. For example, UE 115-*b* may include an accelerometer, GPS, use a third-party mapping or vehicle location information, or the like, to detect motion of the vehicle 510.

At 515, UE 115-*b* may identify UE 115-*b* is associated with the vehicle 510 (e.g., located within the vehicle 510). For example, UE 115-*b* may use the detected motion to determine UE 115-*b* is within the vehicle 510 that is in motion. Additionally, or alternatively, UE 115-*b* may identify UE 115-*b* has established connectivity with the vehicle 510 (e.g., wireless or wired connectivity).

At 520, UE 115-*b* may transmit a data request to the vehicle 510 and the vehicle 510 may receive the data request. For example, UE 115-*b* may request one or more vehicle parameters, such as static parameters, dynamic parameters, or both, from the vehicle 510, as described herein. In some cases, the static parameters may include a vehicle model, a vehicle size, a brake status, payload parameters (e.g., payload weight), inherent acceleration, turning radius, tire wear, towed load, and the like, while the dynamic parameters may include a vehicle speed, a vehicle yaw, an engine status, and the like.

At 525, UE 115-*b* may receive, from the vehicle 510, a data response message indicating at least one vehicle parameter (e.g., a static parameter and/or a dynamic parameter) for the vehicle 510.

At 527, UE 115-*b* may determine one or more vehicle parameters, such as a speed of the vehicle, an acceleration of the vehicle, a heading of the vehicle, a destination location of the vehicle, an intended route of the vehicle, or any combination thereof. For example, UE 115-*b* may receive the information from the vehicle 510 (e.g., based on requesting the data at 520), may calculate or otherwise measure the information at UE 115-*b*, or both. The speed, acceleration, or both, of the vehicle may be determined relative to a coordinate system (e.g., relative to an x-axis, a y-axis, and a z-axis in a Cartesian coordinate system), where speed, acceleration, or both, may be determined along at least one axis in the coordinate system (e.g., in at least one direction along one or more of the three axes in a Cartesian coordinate system). For example, when the UE 115-*b* is unable to establish connectivity with the vehicle 510 (e.g., for an older vehicle that does not support wired or wireless connectivity with a UE), the UE 115-*d* may determine the UE-determined vehicle parameters as described herein. Additionally, UE 115-*d* may determine the UE-determined vehicle parameters in addition to communicating the data request and data response at 520, 525. In other words, UE 115-*d* may independent determine one or more of the vehicle parameters in addition to determining one or more vehicle parameters based on information included in the data response message.

At 530, UE 115-*b* may transmit a message indicating a location of the vehicle 510 and one or more vehicle parameters for the vehicle 510 to a network entity. The network entity may be an RSU 505, base station 105-*b*, or both. For example, the UE 115-*b* may transmit uplink message 245-*a*, 245-*b*, or both, as described herein and with reference to FIGS. 2-4, that include the location of vehicle 510 and may include one or more static vehicle parameters, one or more dynamic vehicle parameters, or both of vehicle 510. UE 115-*b* may transmit the parameters to base station 105-*b* or RSU 505 using one or more IEs in an LPP message via a Uu or PC5 connection. For example, where the uplink message is transmitted to base station 105-*b*, the LPP message may be a control plane message and may be routed to an LPP server (e.g., LPP server 225). The LPP message may be independent of third party navigation applications of UE 115-*b*. For example, LPP messages may be carried via a dedicated bearer between the UE 115-*b* and the RSU 505 or LPP server. The LPP server may forward information from the message (e.g., in a different LPP message) to RSU 505. In some cases, a UE 115 may transmit the parameters to the base station 105 using RRC messages and RRC IEs. For example, RRC IEs specific to the parameters disclosed herein shared by a UE 115 with the network may be conveyed in an RRC message, such as a SidelinkUEInformation message, or in other existing or new RRC messages. The base station 105-*b* may convey the parameters to other network entities (e.g., RSU 505, LPP server 225, other entities coupled with the cellular network comprising base station 105-*b*) via LPP messages as described above.

In some examples, UE 115-*b* may transmit the message based on the detected motion of the vehicle, based on wirelessly pairing with the vehicle, based on establishing a wired connection with the vehicle, based on user input, or a combination thereof. The message may indicate one or more static characteristics of the vehicle 510, such as a vehicle model, a vehicle size, a brake status, or a combination thereof. Additionally, or alternatively, the message may indicate one or more dynamic characteristics of the vehicle 510, such as a speed of the vehicle, a yaw of the vehicle, a yaw rate of the vehicle (e.g., a rate of angular velocity for the vehicle relative to an axis), an engine status, or a combination thereof.

In some cases, UE 115-*b* may receive control signaling from RSU 505, base station 105-*b*, or both indicating an LPP configuration for reporting, via a communication link, one or more IEs in accordance with an LPP. The communication link may be a sidelink (e.g., PC5 link) or an access link (e.g., a Uu link). UE 115-*b* may transmit the location and vehicle parameters using the IEs in accordance with the LPP.

At 535, base station 105-*b*, RSU 505, or both may identify route data, safety data, or both based on the location of the vehicle 510 and the one or more vehicle parameters, which is described in further detail with respect to FIGS. 2-4.

At 540, the RSU 505, base station 105-*b*, or both may transmit the route data, the safety data, or both to UE 115-*b*. For example, the UE may receive downlink messages 260-*a*, 260-*b*, or both, which may include route data 250, safety data 255, as described herein with reference to FIGS. 2-4. The RSU 505, base station 105-*b*, or both, which may be referred to as a network entity, may transmit the route data and safety data via an IE in a message directly to UE 115-*b* (e.g., via RRC or LPP messaging). For example, base station 105-*b* may transmit one or more IEs to UE 115-*b* in RRC or LPP messaging, or both via a Uu connection. The LPP or RRC messaging may be independent of third party navigation applications of UE 115-*b*. UE 115-*b* may send the route data, the safety data, or both to the vehicle 510 via a wired or wireless connection (e.g., via USB or Bluetooth). The vehicle 510 may use the route data, safety data, or both as if the vehicle 510 had received the data via a sidelink connection or V2X connection. As such, the vehicle 510 may interact as a C-V2X capable vehicle, even if the vehicle 510 does not communicate directly with a cellular network.

The safety data may identify location information for one or more other vehicles, a traffic accident, a reduced traffic speed, a collision alert, a status of one or more components of the vehicle, or any combination thereof. The route data may identify one or more of a map, a speed limit, a road construction alert, road congestion, an alternate route, a road topology, or any combination thereof. The RSU 505, base station 105-*b*, or both may transmit the route data, safety data, or both via an access link or a sidelink. Base station 105-*b* may send the route data, safety data, or both to the RSU 505, and the RSU may forward the route data, the safety data, or both to UE 115-*b*.

Beneficially, although a vehicle 510 may not be C-V2X capable, a UE 115 that a user brings with the user into a vehicle while traveling may function as a vehicle UE to provide C-V2X capability for the vehicle. That is, the UE 115 may operate to communicate C-V2X information via the cellular and sidelink commutation channels to provide the C-V2X benefits to a vehicle that lacks such capability.

Figure 6:
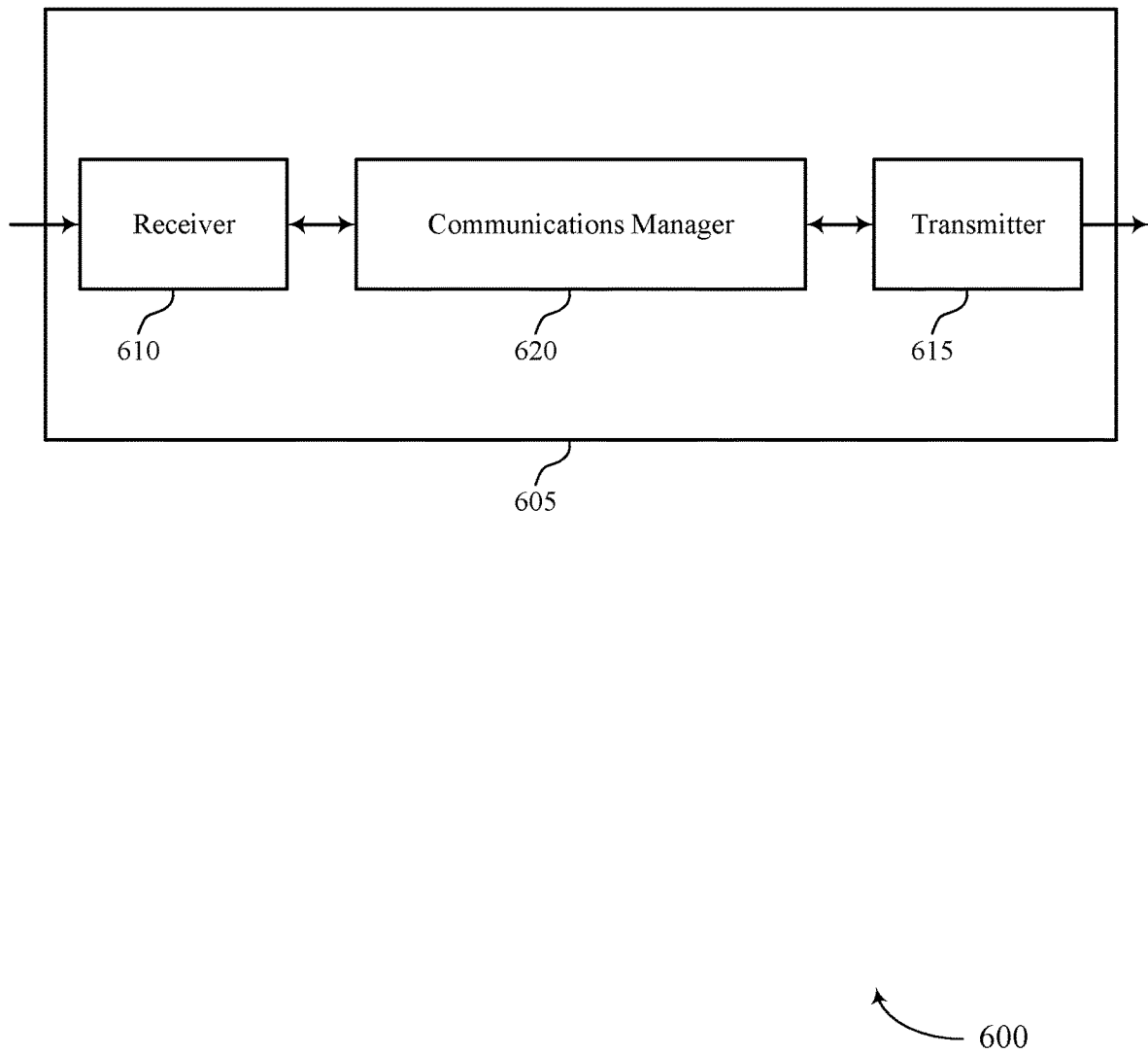
FIGS. 6 and 7 show block diagrams of devices that support UE signaling for vehicle alerting in accordance with aspects of the present disclosure.

FIG. 6 shows a block diagram 600 of a device 605 that supports UE signaling for vehicle alerting in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to UE signaling for vehicle alerting). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to UE signaling for vehicle alerting). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of UE signaling for vehicle alerting as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for identifying that the UE is associated with a vehicle or has established connectivity with the vehicle. The communications manager 620 may be configured as or otherwise support a means for transmitting, to a network entity via a communication link, a first message indicating a location of the vehicle and one or more vehicle parameters for the vehicle. The communications manager 620 may be configured as or otherwise support a means for receiving, based on the location of the vehicle and the one or more vehicle parameters, a second message indicating route data, safety data, or both.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for a UE to relay C-V2X data between a network entity and a vehicle, which may cause reduced processing, reduced power consumption, more efficient utilization of communication resources, improved vehicle navigation, safety, or the like.

Figure 7:
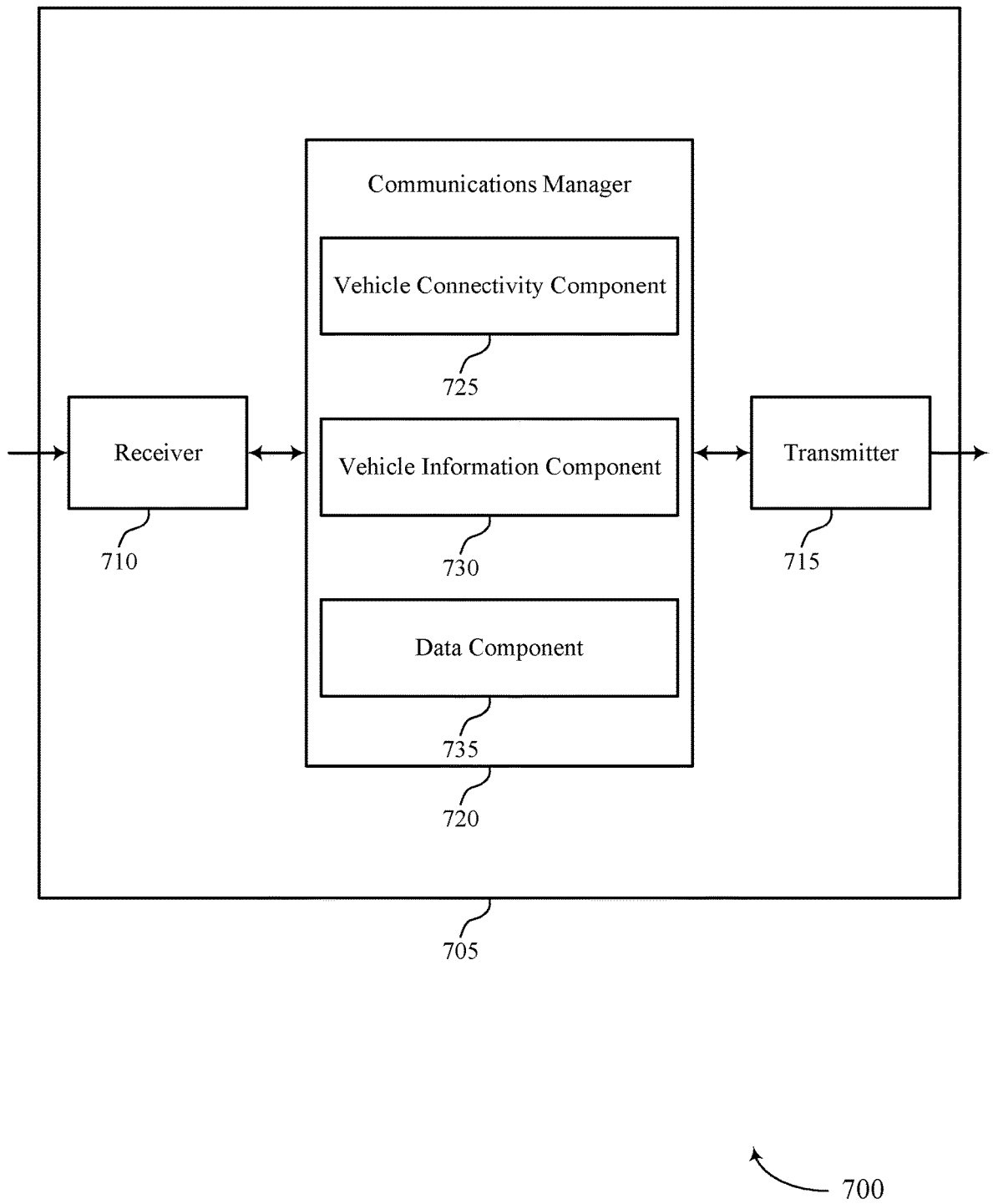

FIG. 7 shows a block diagram 700 of a device 705 that supports UE signaling for vehicle alerting in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to UE signaling for vehicle alerting). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to UE signaling for vehicle alerting). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of UE signaling for vehicle alerting as described herein. For example, the communications manager 720 may include a vehicle connectivity component 725, a vehicle information component 730, a data component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The vehicle connectivity component 725 may be configured as or otherwise support a means for identifying that the UE is associated with a vehicle or has established connectivity with the vehicle. The vehicle information component 730 may be configured as or otherwise support a means for transmitting, to a network entity via a communication link, a first message indicating a location of the vehicle and one or more vehicle parameters for the vehicle. The data component 735 may be configured as or otherwise support a means for receiving, based on the location of the vehicle and the one or more vehicle parameters, a second message indicating route data, safety data, or both.

Figure 8:
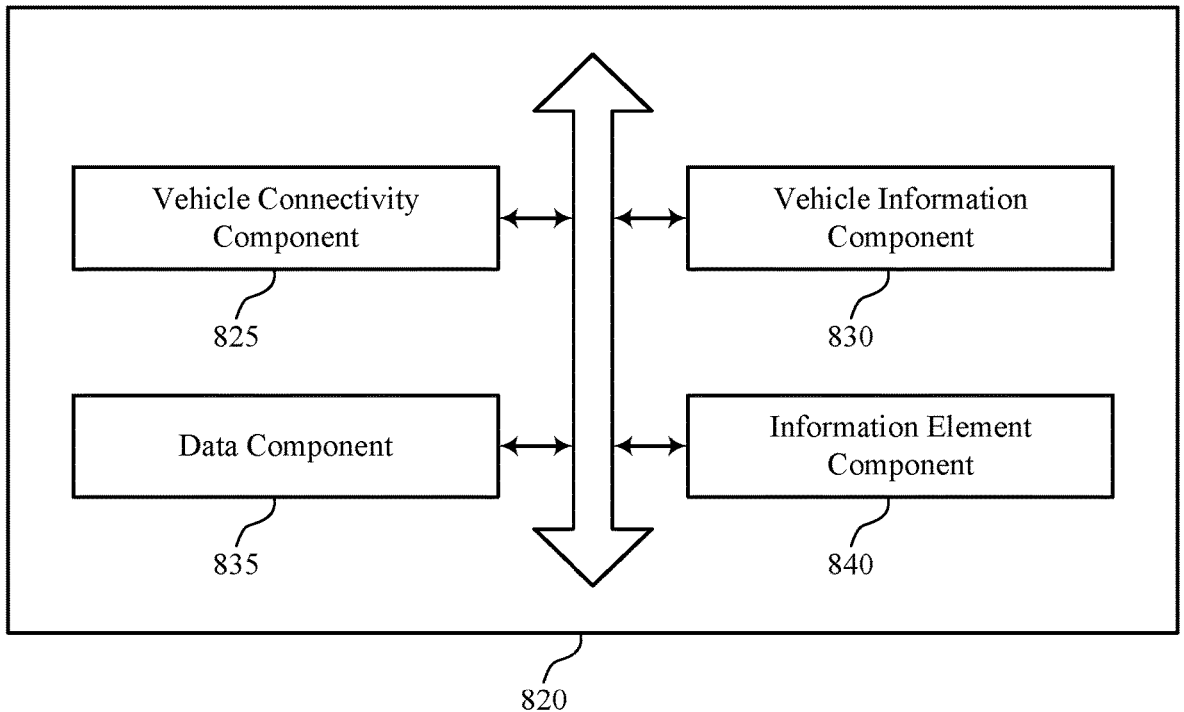
FIG. 8 shows a block diagram of a communications manager that supports UE signaling for vehicle alerting in accordance with aspects of the present disclosure.

FIG. 8 shows a block diagram 800 of a communications manager 820 that supports UE signaling for vehicle alerting in accordance with aspects of the present disclosure. The communications manager 820 may be an example of aspects of a communications manager 620, a communications manager 720, or both, as described herein. The communications manager 820, or various components thereof, may be an example of means for performing various aspects of UE signaling for vehicle alerting as described herein. For example, the communications manager 820 may include a vehicle connectivity component 825, a vehicle information component 830, a data component 835, an information element component 840, or any combination thereof. Each of these components may communicate, directly or indirectly, with one another (e.g., via one or more buses).

The communications manager 820 may support wireless communication at a UE in accordance with examples as disclosed herein. The vehicle connectivity component 825 may be configured as or otherwise support a means for identifying that the UE is associated with a vehicle or has established connectivity with the vehicle. The vehicle information component 830 may be configured as or otherwise support a means for transmitting, to a network entity via a communication link, a first message indicating a location of the vehicle and one or more vehicle parameters for the vehicle. The data component 835 may be configured as or otherwise support a means for receiving, based on the location of the vehicle and the one or more vehicle parameters, a second message indicating route data, safety data, or both.

In some examples, transmitting the first message based on detected motion of the vehicle by the UE.

In some examples, transmitting the first message based on wirelessly pairing of the UE with the vehicle, where establishing connectivity with the vehicle includes wirelessly pairing of the UE with the vehicle.

In some examples, transmitting the first message based on the UE establishing connectivity with the vehicle via a wired connection.

In some examples, transmitting the first message in response to user input indicating that the UE is associated with the vehicle.

In some examples, the data component 835 may be configured as or otherwise support a means for transmitting a data request to the vehicle. In some examples, the data component 835 may be configured as or otherwise support a means for receiving a data response message indicating at least one vehicle parameter of the one or more vehicle parameters.

In some examples, transmitting the first message indicating the one or more vehicle parameters that identifies one or more static characteristics of the vehicle, where the second message is received based on the one or more static characteristics of the vehicle.

In some examples, the one or more static characteristics include a vehicle model, a vehicle size, a brake status, or a combination thereof.

In some examples, transmitting the first message indicating the one or more vehicle parameters that identifies one or more dynamic characteristics of the vehicle, where the second message is received based on the one or more dynamic characteristics of the vehicle.

In some examples, the one or more dynamic characteristics include a speed of the vehicle, a yaw of the vehicle, a yaw rate of the vehicle, an engine status, or a combination thereof.

In some examples, the vehicle information component 830 may be configured as or otherwise support a means for determining, by the UE, the one or more vehicle parameters including a speed of the vehicle, an acceleration of the vehicle, a heading of the vehicle, a destination location of the vehicle, an intended route of the vehicle, or any combination thereof. The speed, acceleration, or both, of the vehicle may be determined in at least one direction relative to at least one axes of a coordinate system.

In some examples, receiving the second message indicating the safety data that identifies location information for one or more other vehicles, a traffic accident, a reduced traffic speed, a collision alert, a status of one or more components of the vehicle, or any combination thereof.

In some examples, receiving the second message indicating the route data that identifies one or more of a map, a speed limit, a road construction alert, road congestion, an alternate route, a road topology, or any combination thereof.

In some examples, the information element component 840 may be configured as or otherwise support a means for receiving, from the network entity, control signaling indicating a location positioning protocol configuration for reporting, via the communication link, one or more information elements in accordance with a location positioning protocol, where the communication link is a sidelink or an access link, and where transmitting the first message includes. In some examples, the information element component 840 may be configured as or otherwise support a means for transmitting, via the sidelink or the access link, the one or more information elements in accordance with the location positioning protocol configuration, the one or more information elements indicating the location of the vehicle, the one or more vehicle parameters for the vehicle, or both.

In some examples, the network entity is a base station or a road side unit.

In some examples, receiving the second message via a sidelink or an access link.

Figure 9:
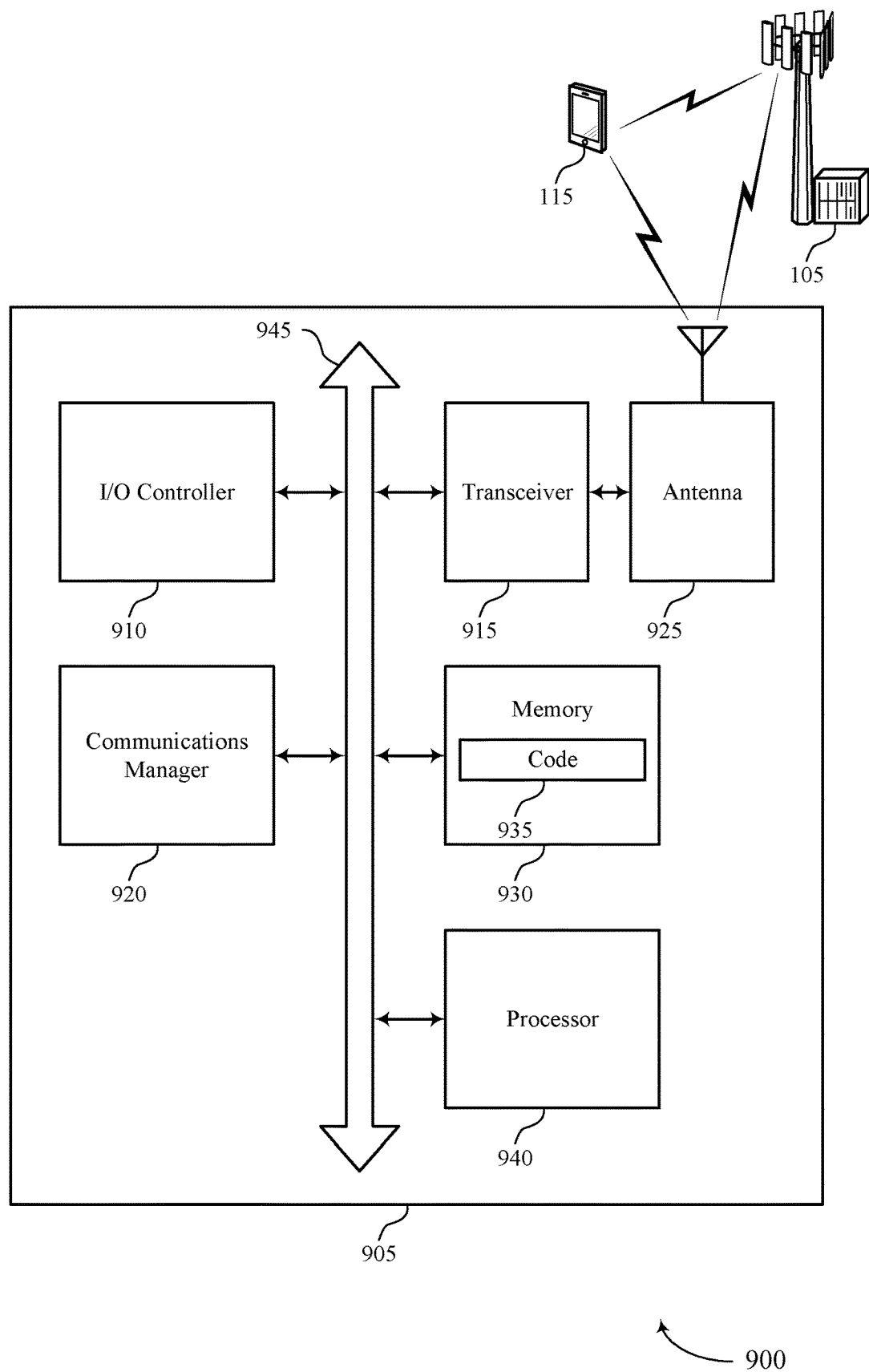
FIG. 9 shows a diagram of a system including a device that supports UE signaling for vehicle alerting in accordance with aspects of the present disclosure.

FIG. 9 shows a diagram of a system 900 including a device 905 that supports UE signaling for vehicle alerting in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting UE signaling for vehicle alerting). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for identifying that the UE is associated with a vehicle or has established connectivity with the vehicle. The communications manager 920 may be configured as or otherwise support a means for transmitting, to a network entity via a communication link, a first message indicating a location of the vehicle and one or more vehicle parameters for the vehicle. The communications manager 920 may be configured as or otherwise support a means for receiving, based on the location of the vehicle and the one or more vehicle parameters, a second message indicating route data, safety data, or both.

By including or configuring the communications manager 920 in accordance with examples as described herein, the device 905 may support techniques for a UE to relay C-V2X data between a network entity and a vehicle, which may cause improved communication reliability, reduced latency, improved user experience related to reduced processing, reduced power consumption, more efficient utilization of communication resources, improved coordination between devices, improved utilization of processing capability, and the like.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of UE signaling for vehicle alerting as described herein, or the processor 940 and the memory 930 may be otherwise configured to perform or support such operations.

Figure 10:
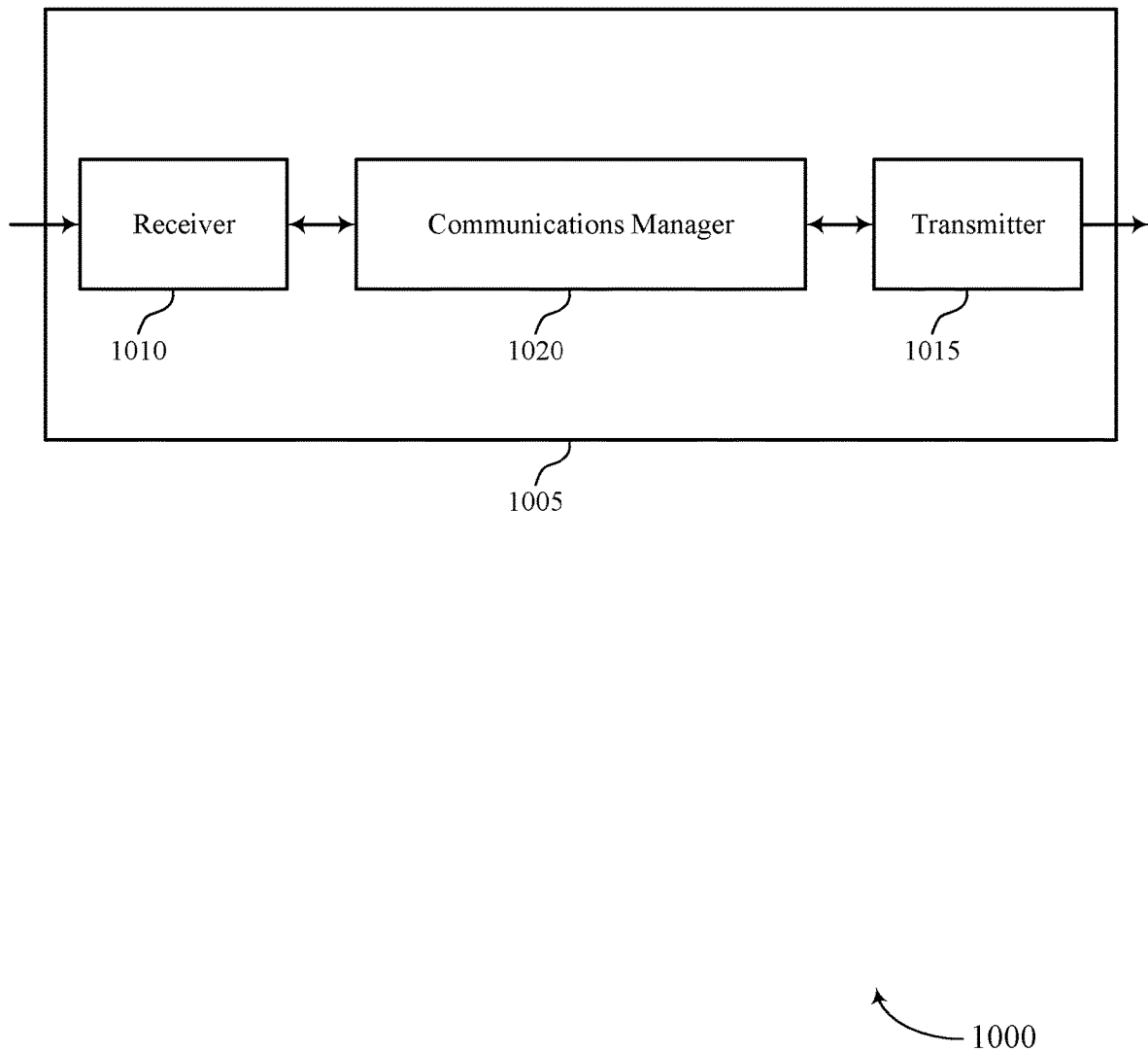
FIGS. 10 and 11 show block diagrams of devices that support UE signaling for vehicle alerting in accordance with aspects of the present disclosure.

FIG. 10 shows a block diagram 1000 of a device 1005 that supports UE signaling for vehicle alerting in accordance with aspects of the present disclosure. The device 1005 may be an example of aspects of a network entity, such as a base station or an RSU, as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to UE signaling for vehicle alerting). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to UE signaling for vehicle alerting). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of UE signaling for vehicle alerting as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a network entity in accordance with examples as disclosed herein. For example, the communications manager 1020 may be configured as or otherwise support a means for receiving, from a UE, a message indicating one or more vehicle parameters for a vehicle associated with the UE and a location of the vehicle. The communications manager 1020 may be configured as or otherwise support a means for identifying route data, safety data, or both, based on the location of the vehicle and the one or more vehicle parameters. The communications manager 1020 may be configured as or otherwise support a means for transmitting, to the UE, a response message including the route data, the safety data, or both.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for a UE to relay C-V2X data between a network entity and a vehicle, which may cause reduced processing, reduced power consumption, more efficient utilization of communication resources, and the like.

Figure 11:
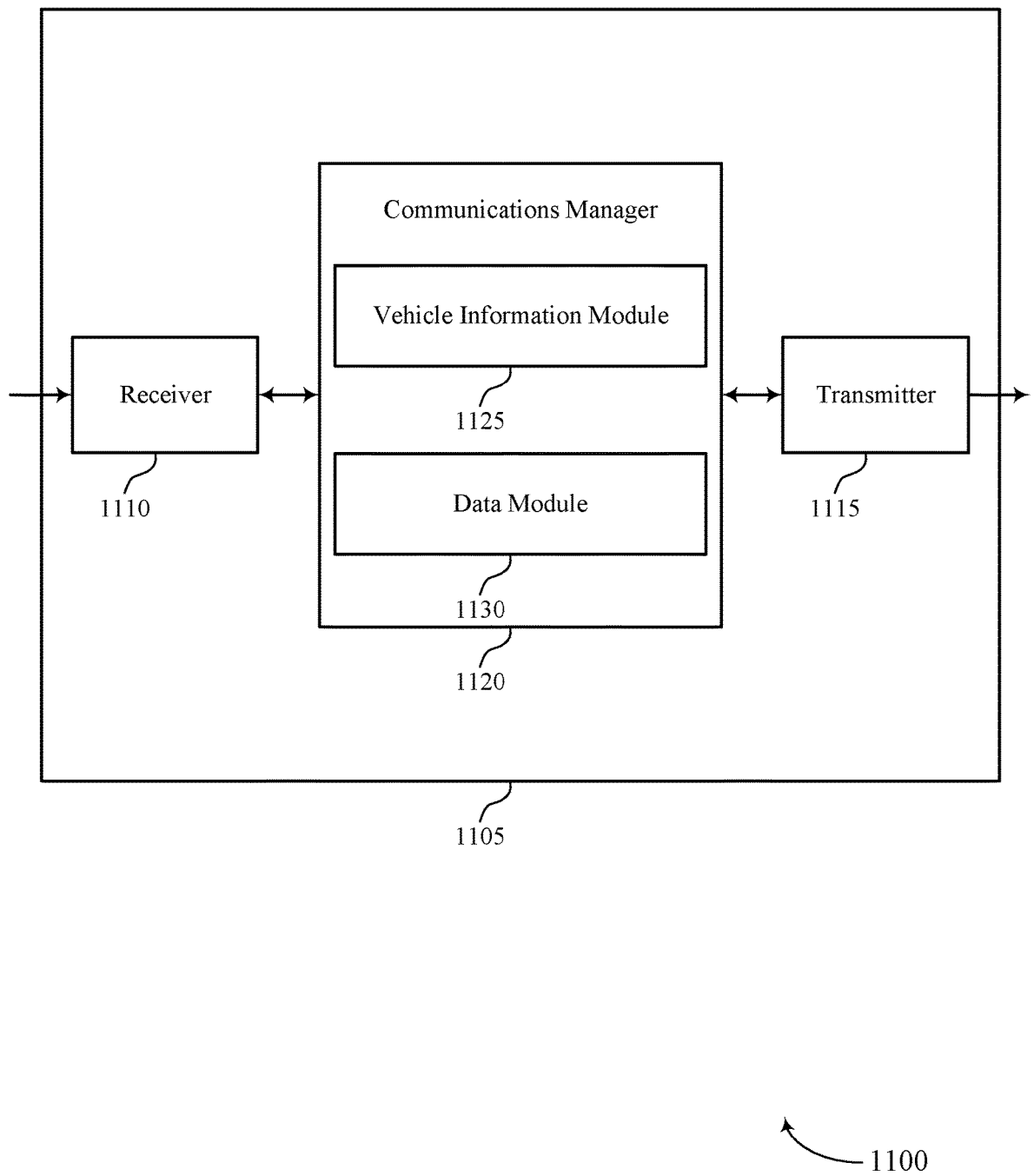

FIG. 11 shows a block diagram 1100 of a device 1105 that supports UE signaling for vehicle alerting in accordance with aspects of the present disclosure. The device 1105 may be an example of aspects of a device 1005 or a network entity, such as a base station or an RSU, 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to UE signaling for vehicle alerting). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to UE signaling for vehicle alerting). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of UE signaling for vehicle alerting as described herein. For example, the communications manager 1120 may include a vehicle information module 1125 a data module 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a network entity in accordance with examples as disclosed herein. The vehicle information module 1125 may be configured as or otherwise support a means for receiving, from a UE, a message indicating one or more vehicle parameters for a vehicle associated with the UE and a location of the vehicle. The data module 1130 may be configured as or otherwise support a means for identifying route data, safety data, or both, based on the location of the vehicle and the one or more vehicle parameters. The data module 1130 may be configured as or otherwise support a means for transmitting, to the UE, a response message including the route data, the safety data, or both.

Figure 12:
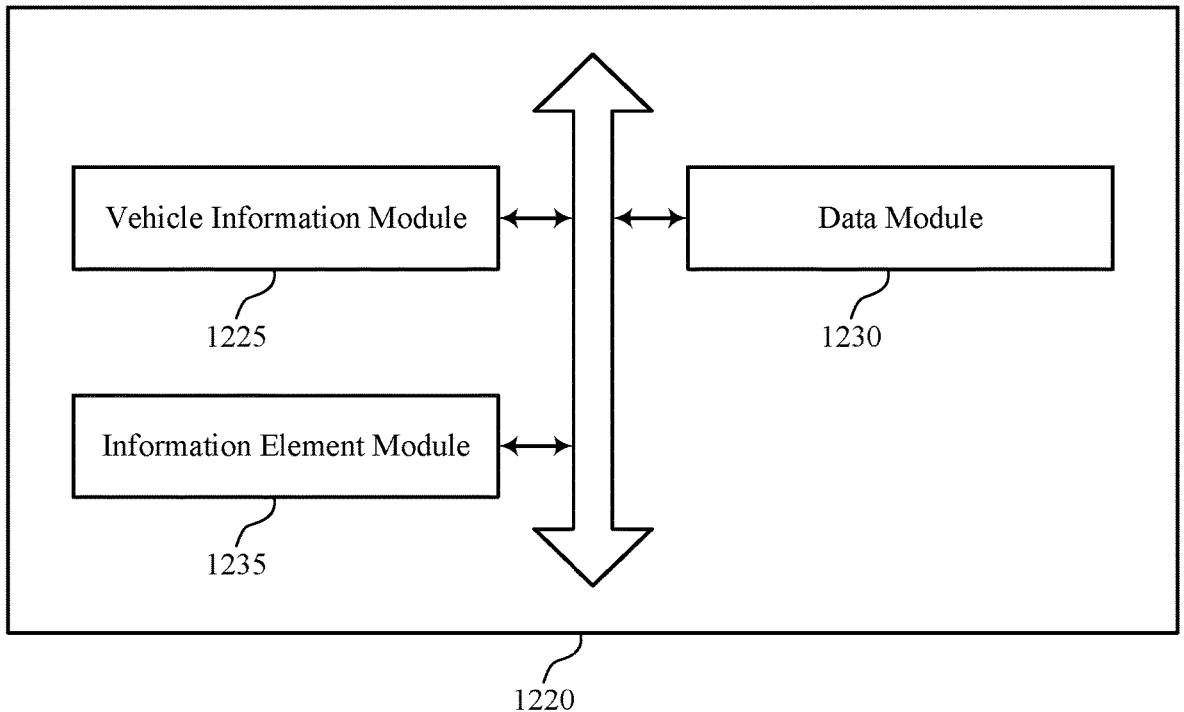
FIG. 12 shows a block diagram of a communications manager that supports UE signaling for vehicle alerting in accordance with aspects of the present disclosure.

FIG. 12 shows a block diagram 1200 of a communications manager 1220 that supports UE signaling for vehicle alerting in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of UE signaling for vehicle alerting as described herein. For example, the communications manager 1220 may include a vehicle information module 1225, a data module 1230, an information element module 1235, or any combination thereof. Each of these components may communicate, directly or indirectly, with one another (e.g., via one or more buses).

The communications manager 1220 may support wireless communication at a network entity in accordance with examples as disclosed herein. The vehicle information module 1225 may be configured as or otherwise support a means for receiving, from a UE, a message indicating one or more vehicle parameters for a vehicle associated with the UE and a location of the vehicle. The data module 1230 may be configured as or otherwise support a means for identifying route data, safety data, or both, based on the location of the vehicle and the one or more vehicle parameters. In some examples, the data module 1230 may be configured as or otherwise support a means for transmitting, to the UE, a response message including the route data, the safety data, or both.

In some examples, receiving the message indicating the one or more vehicle parameters that identifies one or more static characteristics of the vehicle, where the response message is transmitted based on the one or more static characteristics of the vehicle.

In some examples, the one or more static characteristics include a vehicle model, a vehicle size, a brake status, or a combination thereof.

In some examples, receiving the message indicating the one or more vehicle parameters that identifies one or more dynamic characteristics of the vehicle, where the response message is transmitted based on the one or more dynamic characteristics of the vehicle.

In some examples, the one or more dynamic characteristics include a speed of the vehicle, a yaw of the vehicle, a yaw rate of the vehicle, an engine status, or a combination thereof.

In some examples, the message indicates that the UE determined the one or more vehicle parameters including a speed of the vehicle, an acceleration of the vehicle, a heading of the vehicle, a destination location of the vehicle, an intended route of the vehicle, or any combination thereof.

In some examples, transmitting the response message indicating the safety data that identifies location information for one or more other vehicles, a traffic accident, a reduced traffic speed, a collision alert, a status of one or more components of the vehicle, or any combination thereof.

In some examples, transmitting the response message indicating the route data that identifies one or more of a map, a speed limit, a road construction alert, road congestion, an alternate route, a road topology, or any combination thereof.

In some examples, the information element module 1235 may be configured as or otherwise support a means for transmitting, to the UE, control signaling indicating a location positioning protocol configuration for reporting, via a sidelink or an access link, one or more information elements in accordance with a location positioning protocol, where receiving the message includes. In some examples, the information element module 1235 may be configured as or otherwise support a means for receiving, via the sidelink or the access link, the one or more information elements in accordance with the location positioning protocol configuration, the one or more information elements indicating the location of the vehicle, the one or more vehicle parameters for the vehicle, or both.

In some examples, transmitting the response message to a road side unit, the response message instructing the road side unit to forward the route data, the safety data, or both, to the UE.

In some examples, the network entity is a base station or a road side unit.

In some examples, transmitting the response message via a sidelink or an access link.

Figure 13:
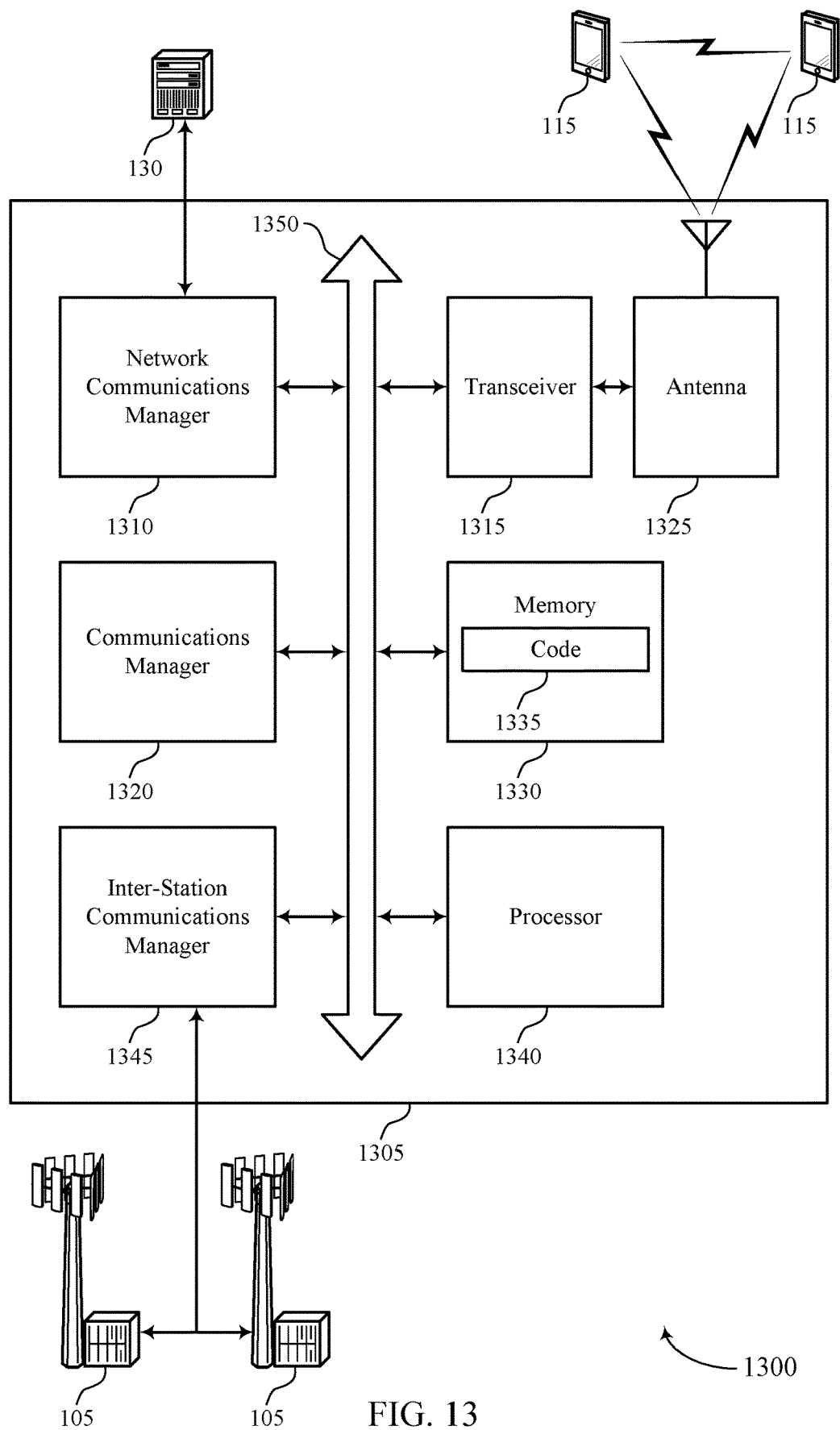
FIG. 13 shows a diagram of a system including a device that supports UE signaling for vehicle alerting in accordance with aspects of the present disclosure.

FIG. 13 shows a diagram of a system 1300 including a device 1305 that supports UE signaling for vehicle alerting in accordance with aspects of the present disclosure. The device 1305 may be an example of or include the components of a device 1005, a device 1105, or a Network entity, such as a base station or an RSU, as described herein. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting UE signaling for vehicle alerting). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a network entity in accordance with examples as disclosed herein. For example, the communications manager 1320 may be configured as or otherwise support a means for receiving, from a UE, a message indicating one or more vehicle parameters for a vehicle associated with the UE and a location of the vehicle. The communications manager 1320 may be configured as or otherwise support a means for identifying route data, safety data, or both, based on the location of the vehicle and the one or more vehicle parameters. The communications manager 1320 may be configured as or otherwise support a means for transmitting, to the UE, a response message including the route data, the safety data, or both.

By including or configuring the communications manager 1320 in accordance with examples as described herein, the device 1305 may support techniques for a UE to relay C-V2X data between a network entity and a vehicle, which may cause improved communication reliability, reduced latency, improved user experience related to reduced processing, reduced power consumption, more efficient utilization of communication resources, improved coordination between devices, improved utilization of processing capability, and the like.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of UE signaling for vehicle alerting as described herein, or the processor 1340 and the memory 1330 may be otherwise configured to perform or support such operations.

Figure 14:
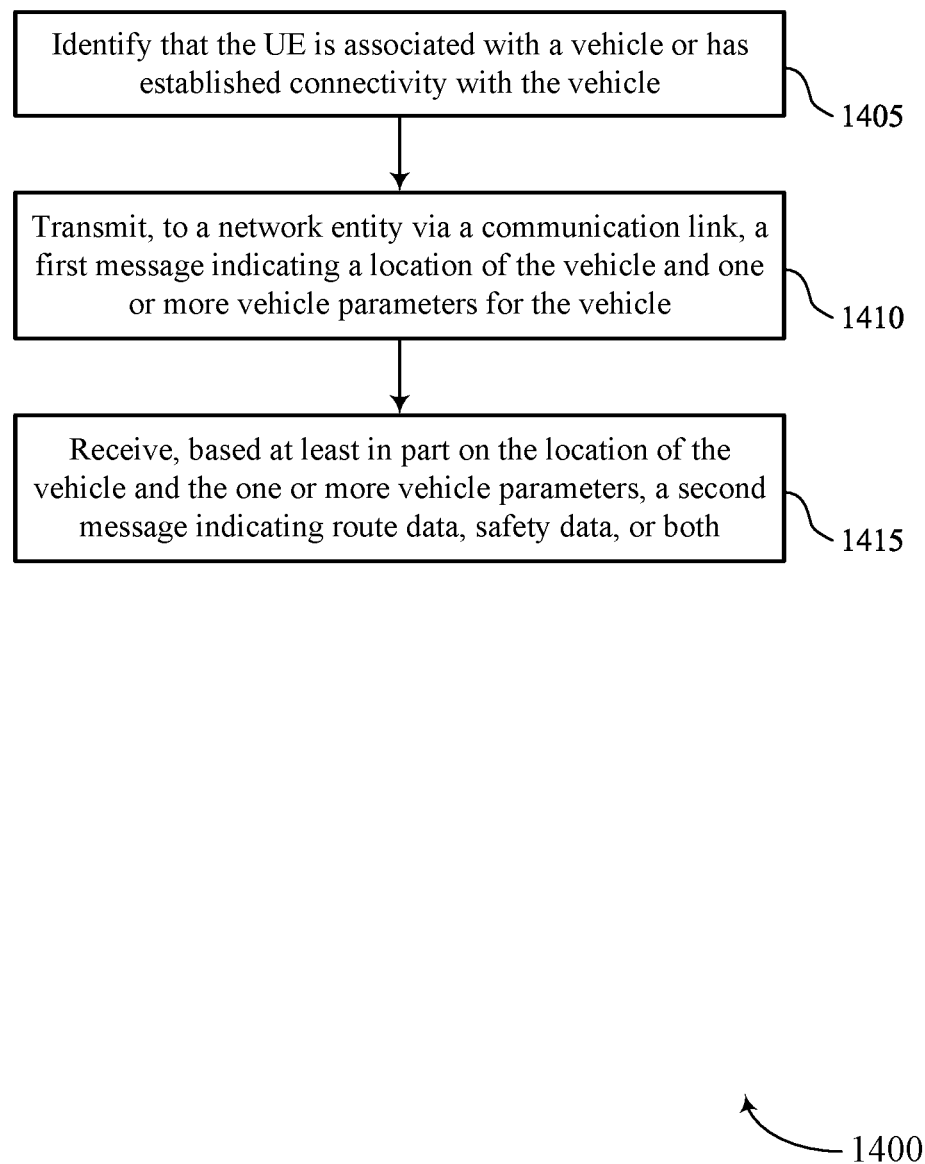
FIGS. 14 through 18 show flowcharts illustrating methods that support UE signaling for vehicle alerting in accordance with aspects of the present disclosure.

FIG. 14 shows a flowchart illustrating a method 1400 that supports UE signaling for vehicle alerting in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include identifying that the UE is associated with a vehicle or has established connectivity with the vehicle. The operations of 1405 may be performed in accordance with examples as disclosed herein. In some examples, aspects of the operations of 1405 may be performed by a vehicle connectivity component 825 as described with reference to FIG. 8.

At 1410, the method may include transmitting, to a network entity via a communication link, a first message indicating a location of the vehicle and one or more vehicle parameters for the vehicle. The operations of 1410 may be performed in accordance with examples as disclosed herein. In some examples, aspects of the operations of 1410 may be performed by a vehicle information component 830 as described with reference to FIG. 8.

At 1415, the method may include receiving, based on the location of the vehicle and the one or more vehicle parameters, a second message indicating route data, safety data, or both. The operations of 1415 may be performed in accordance with examples as disclosed herein. In some examples, aspects of the operations of 1415 may be performed by a data component 835 as described with reference to FIG. 8.

Figure 15:
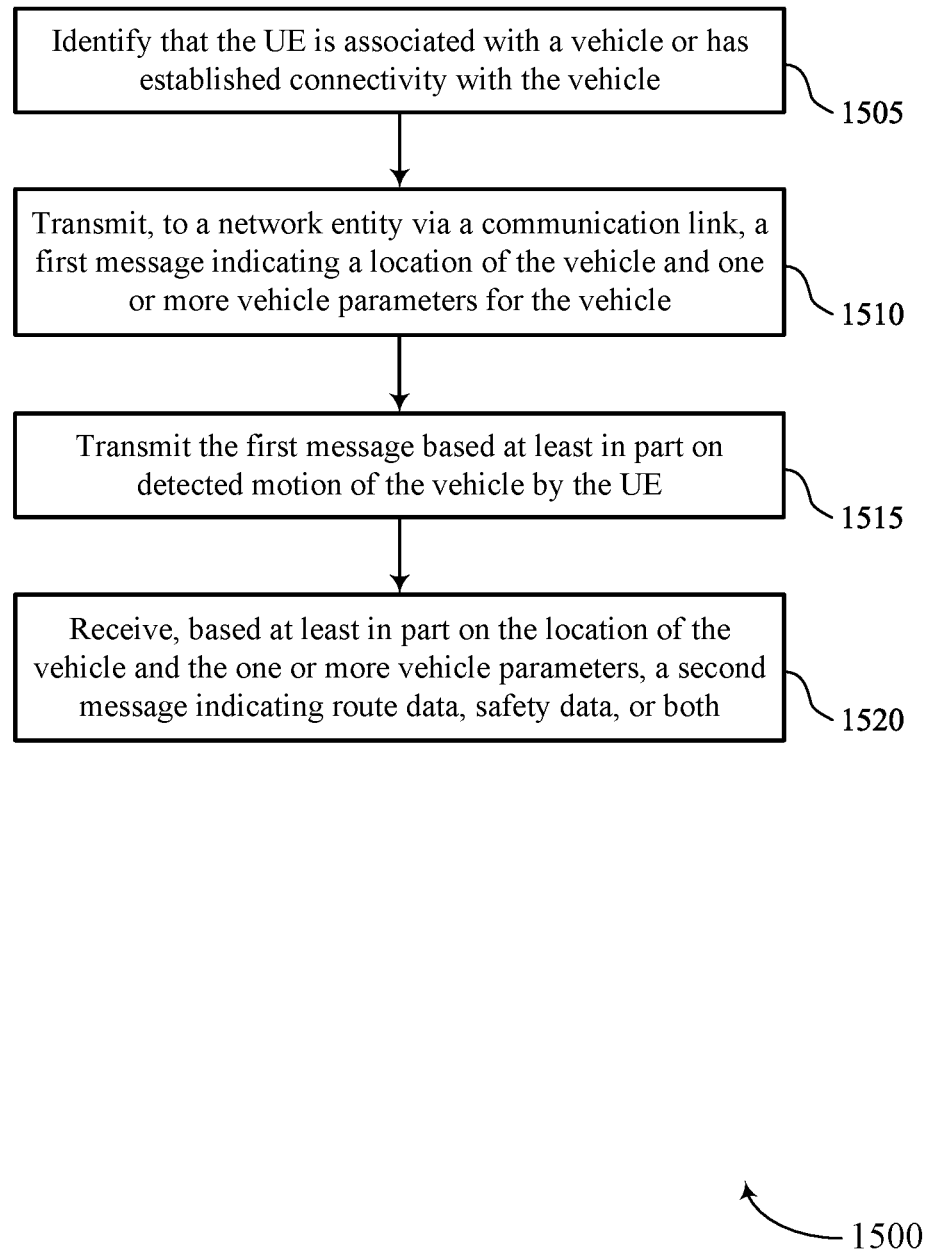

FIG. 15 shows a flowchart illustrating a method 1500 that supports UE signaling for vehicle alerting in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include identifying that the UE is associated with a vehicle or has established connectivity with the vehicle. The operations of 1505 may be performed in accordance with examples as disclosed herein. In some examples, aspects of the operations of 1505 may be performed by a vehicle connectivity component 825 as described with reference to FIG. 8.

At 1510, the method may include transmitting, to a network entity via a communication link, a first message indicating a location of the vehicle and one or more vehicle parameters for the vehicle. The operations of 1510 may be performed in accordance with examples as disclosed herein. In some examples, aspects of the operations of 1510 may be performed by a vehicle information component 830 as described with reference to FIG. 8.

At 1515, the method may include transmitting the first message based on detected motion of the vehicle by the UE. The operations of 1515 may be performed in accordance with examples as disclosed herein. In some examples, aspects of the operations of 1515 may be performed by a vehicle information component 830 as described with reference to FIG. 8.

At 1520, the method may include receiving, based on the location of the vehicle and the one or more vehicle parameters, a second message indicating route data, safety data, or both. The operations of 1520 may be performed in accordance with examples as disclosed herein. In some examples, aspects of the operations of 1520 may be performed by a data component 835 as described with reference to FIG. 8.

Figure 16:
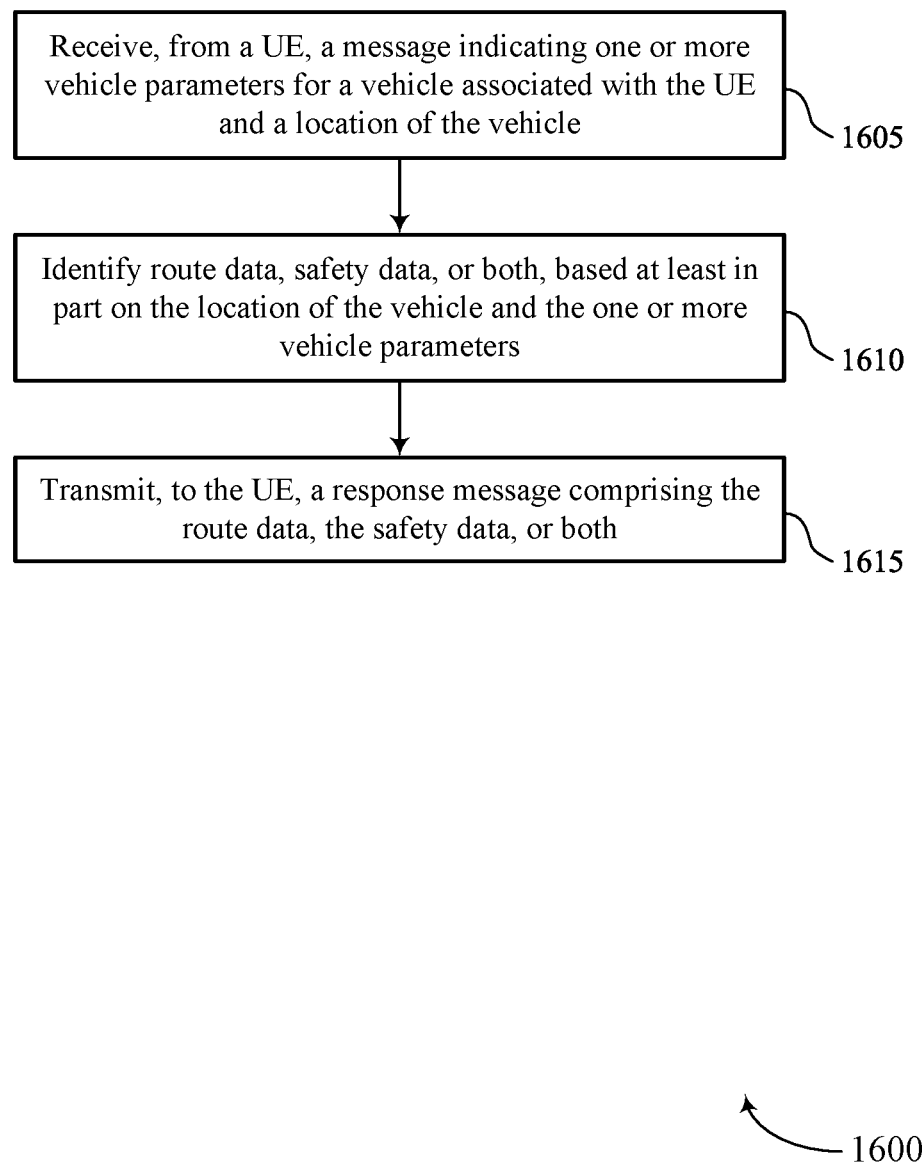

FIG. 16 shows a flowchart illustrating a method 1600 that supports UE signaling for vehicle alerting in accordance with aspects of the present disclosure. The operations of the method 1600 may be implemented by a network entity, such as a base station or an RSU, or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include receiving, from a UE, a message indicating one or more vehicle parameters for a vehicle associated with the UE and a location of the vehicle. The operations of 1605 may be performed in accordance with examples as disclosed herein. In some examples, aspects of the operations of 1605 may be performed by a vehicle information module 1225 as described with reference to FIG. 12.

At 1610, the method may include identifying route data, safety data, or both, based on the location of the vehicle and the one or more vehicle parameters. The operations of 1610 may be performed in accordance with examples as disclosed herein. In some examples, aspects of the operations of 1610 may be performed by a data module 1230 as described with reference to FIG. 12.

At 1615, the method may include transmitting, to the UE, a response message including the route data, the safety data, or both. The operations of 1615 may be performed in accordance with examples as disclosed herein. In some examples, aspects of the operations of 1615 may be performed by a data module 1230 as described with reference to FIG. 12.

Figure 17:
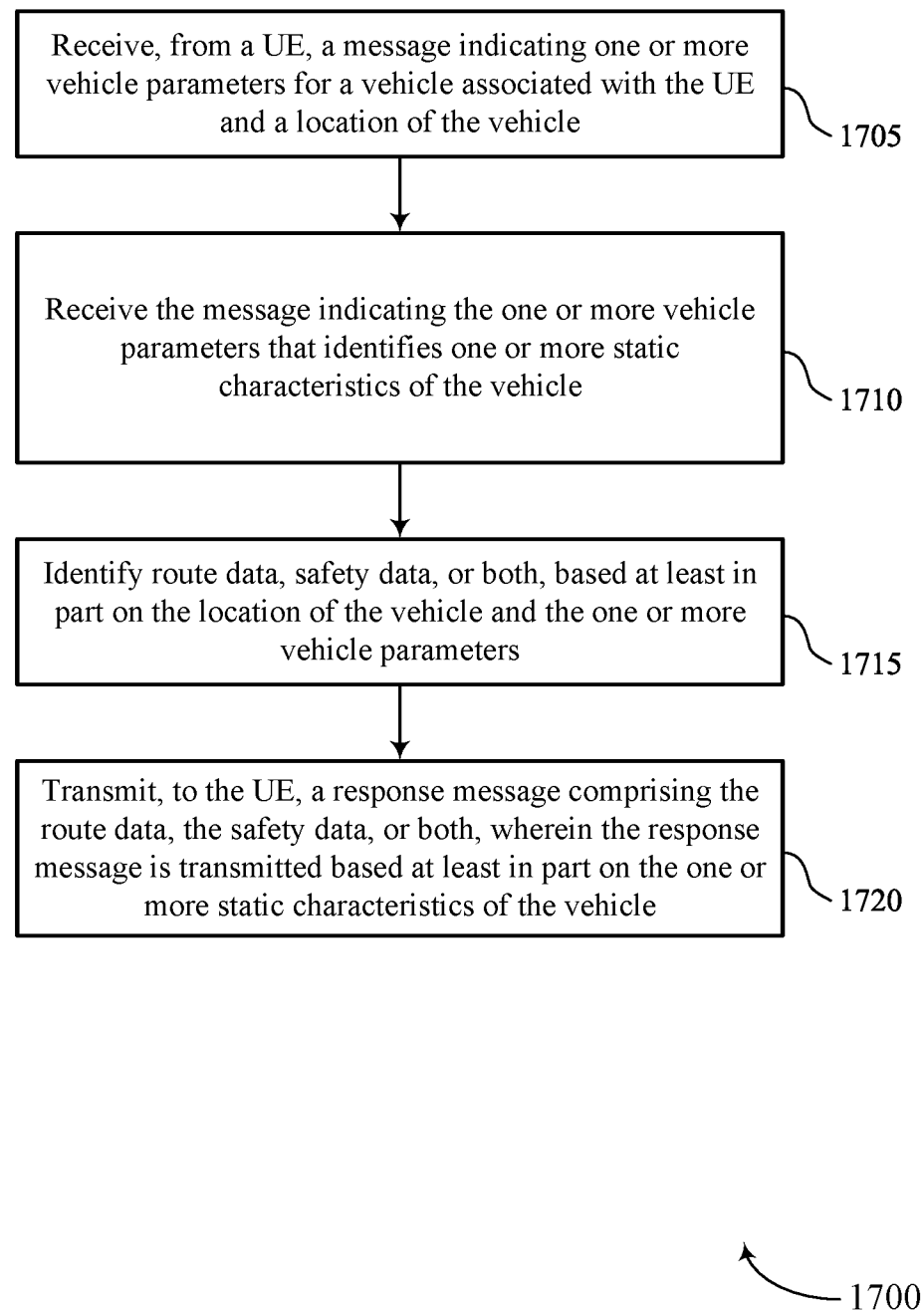

FIG. 17 shows a flowchart illustrating a method 1700 that supports UE signaling for vehicle alerting in accordance with aspects of the present disclosure. The operations of the method 1700 may be implemented by a network entity, such as a base station or an RSU, or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include receiving, from a UE, a message indicating one or more vehicle parameters for a vehicle associated with the UE and a location of the vehicle. The operations of 1705 may be performed in accordance with examples as disclosed herein. In some examples, aspects of the operations of 1705 may be performed by a vehicle information module 1225 as described with reference to FIG. 12.

At 1710, the method may include receiving the message indicating the one or more vehicle parameters that identifies one or more static characteristics of the vehicle. The operations of 1710 may be performed in accordance with examples as disclosed herein. In some examples, aspects of the operations of 1710 may be performed by a vehicle information module 1225 as described with reference to FIG. 12.

At 1715, the method may include identifying route data, safety data, or both, based on the location of the vehicle and the one or more vehicle parameters. The operations of 1715 may be performed in accordance with examples as disclosed herein. In some examples, aspects of the operations of 1715 may be performed by a data module 1230 as described with reference to FIG. 12.

At 1720, the method may include transmitting, to the UE, a response message including the route data, the safety data, or both, where the response message is transmitted based on the one or more static characteristics of the vehicle. The operations of 1720 may be performed in accordance with examples as disclosed herein. In some examples, aspects of the operations of 1720 may be performed by a data module 1230 as described with reference to FIG. 12.

Figure 18:
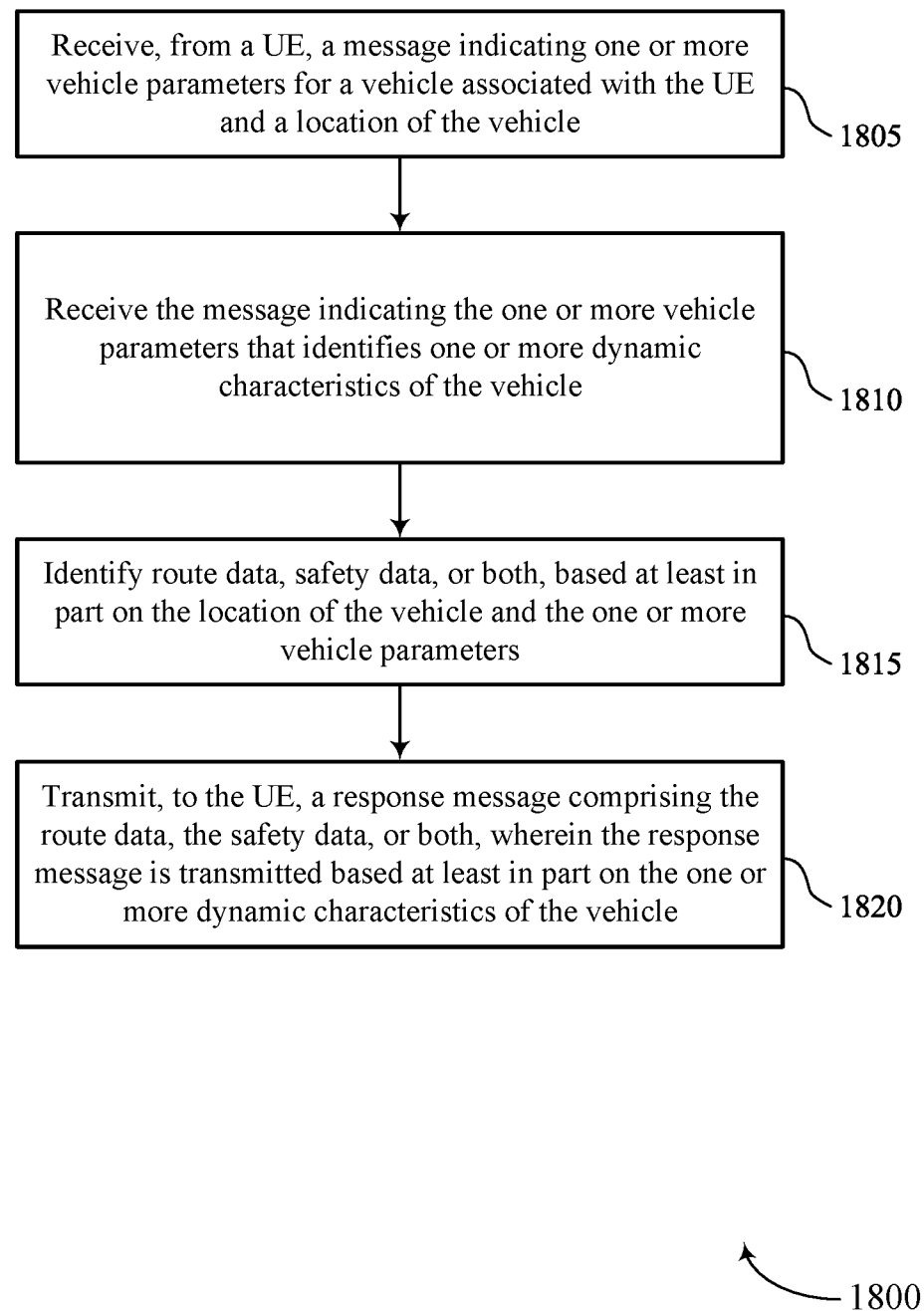

FIG. 18 shows a flowchart illustrating a method 1800 that supports UE signaling for vehicle alerting in accordance with aspects of the present disclosure. The operations of the method 1800 may be implemented by a network entity, such as a base station or an RSU, or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include receiving, from a UE, a message indicating one or more vehicle parameters for a vehicle associated with the UE and a location of the vehicle. The operations of 1805 may be performed in accordance with examples as disclosed herein. In some examples, aspects of the operations of 1805 may be performed by a vehicle information module 1225 as described with reference to FIG. 12.

At 1810, the method may include receiving the message indicating the one or more vehicle parameters that identifies one or more dynamic characteristics of the vehicle. The operations of 1810 may be performed in accordance with examples as disclosed herein. In some examples, aspects of the operations of 1810 may be performed by a vehicle information module 1225 as described with reference to FIG. 12.

At 1815, the method may include identifying route data, safety data, or both, based on the location of the vehicle and the one or more vehicle parameters. The operations of 1815 may be performed in accordance with examples as disclosed herein. In some examples, aspects of the operations of 1815 may be performed by a data module 1230 as described with reference to FIG. 12.

At 1820, the method may include transmitting, to the UE, a response message including the route data, the safety data, or both, where the response message is transmitted based on the one or more dynamic characteristics of the vehicle. The operations of 1820 may be performed in accordance with examples as disclosed herein. In some examples, aspects of the operations of 1820 may be performed by a data module 1230 as described with reference to FIG. 12.

The following provides an overview of aspects of the present disclosure:

Aspect 1: A method for wireless communication at a UE, comprising: identifying that the UE is associated with a vehicle or has established connectivity with the vehicle; transmitting, to a network entity via a communication link, a first message indicating a location of the vehicle and one or more vehicle parameters for the vehicle; and receiving, based at least in part on the location of the vehicle and the one or more vehicle parameters, a second message indicating route data, safety data, or both.

Aspect 2: The method of aspect 1, wherein transmitting the first message includes transmitting the first message based at least in part on detected motion of the vehicle by the UE.

Aspect 3: The method of any of aspects 1 through 2, wherein transmitting the first message includes transmitting the first message based at least in part on wirelessly pairing of the UE with the vehicle, wherein establishing connectivity with the vehicle comprises wirelessly pairing of the UE with the vehicle.

Aspect 4: The method of any of aspects 1 through 3, wherein transmitting the first message includes transmitting the first message based at least in part on the UE establishing connectivity with the vehicle via a wired connection.

Aspect 5: The method of any of aspects 1 through 4, wherein transmitting the first message includes transmitting the first message in response to user input indicating that the UE is associated with the vehicle.

Aspect 6: The method of any of aspects 1 through 5 further comprising: transmitting a data request to the vehicle; receiving a data response message indicating at least one vehicle parameter of the one or more vehicle parameters.

Aspect 7: The method of any of aspects 1 through 6, wherein transmitting the first message includes transmitting the first message indicating the one or more vehicle parameters that identifies one or more static characteristics of the vehicle, wherein the second message is received based at least in part on the one or more static characteristics of the vehicle.

Aspect 8: The method of aspect 7, wherein the one or more static characteristics comprise a vehicle model, a vehicle size, a brake status, or a combination thereof.

Aspect 9: The method of any of aspects 1 through 8, wherein transmitting the first message includes transmitting the first message indicating the one or more vehicle parameters that identifies one or more dynamic characteristics of the vehicle, wherein the second message is received based at least in part on the one or more dynamic characteristics of the vehicle.

Aspect 10: The method of aspect 9, wherein the one or more dynamic characteristics comprise a speed of the vehicle, a yaw of the vehicle, a yaw rate of the vehicle, an engine status, or a combination thereof.

Aspect 11: The method of any of aspects 1 through 10 further comprising: determining, by the UE, the one or more vehicle parameters comprising a speed of the vehicle in at least one direction, an acceleration of the vehicle in at least one direction, a heading of the vehicle, a destination location of the vehicle, an intended route of the vehicle, or any combination thereof.

Aspect 12: The method of any of aspects 1 through 11, wherein receiving the second message includes receiving the second message indicating the safety data that identifies location information for one or more other vehicles, a traffic accident, a reduced traffic speed, a collision alert, a status of one or more components of the vehicle, or any combination thereof.

Aspect 13: The method of any of aspects 1 through 12, wherein receiving the second message includes receiving the second message indicating the route data that identifies one or more of a map, a speed limit, a road construction alert, road congestion, an alternate route, a road topology, or any combination thereof.

Aspect 14: The method of any of aspects 1 through 13, further comprising: receiving, from the network entity, control signaling indicating a location positioning protocol configuration for reporting, via the communication link, one or more information elements in accordance with a location positioning protocol, wherein the communication link is a sidelink or an access link, and wherein transmitting the first message includes: transmitting, via the sidelink or the access link, the one or more information elements in accordance with the location positioning protocol configuration, the one or more information elements indicating the location of the vehicle, the one or more vehicle parameters for the vehicle, or both.

Aspect 15: The method of any of aspects 1 through 14, wherein the network entity is a base station or a road side unit.

Aspect 16: The method of any of aspects 1 through 15, wherein receiving the second message includes receiving the second message via a sidelink or an access link.

Aspect 17: A method for wireless communication at a network entity, comprising: receiving, from a UE, a message indicating one or more vehicle parameters for a vehicle associated with the UE and a location of the vehicle; identifying route data, safety data, or both, based at least in part on the location of the vehicle and the one or more vehicle parameters; and transmitting, to the UE, a response message comprising the route data, the safety data, or both.

Aspect 18: The method of aspect 17, wherein receiving the message includes receiving the message indicating the one or more vehicle parameters that identifies one or more static characteristics of the vehicle, wherein the response message is transmitted based at least in part on the one or more static characteristics of the vehicle.

Aspect 19: The method of aspect 18, wherein the one or more static characteristics comprise a vehicle model, a vehicle size, a brake status, or a combination thereof.

Aspect 20: The method of any of aspects 17 through 19, wherein receiving the message includes receiving the message indicating the one or more vehicle parameters that identifies one or more dynamic characteristics of the vehicle, wherein the response message is transmitted based at least in part on the one or more dynamic characteristics of the vehicle.

Aspect 21: The method of aspect 20, wherein the one or more dynamic characteristics comprise a speed of the vehicle, a yaw of the vehicle, a yaw rate of the vehicle, an engine status, or a combination thereof.

Aspect 22: The method of any of aspects 17 through 21 wherein the message indicates that the UE determined the one or more vehicle parameters comprising a speed of the vehicle in at least one direction, an acceleration of the vehicle in at least one direction, a heading of the vehicle, a destination location of the vehicle, an intended route of the vehicle, or any combination thereof.

Aspect 23: The method of any of aspects 17 through 22, wherein transmitting the response message includes transmitting the response message indicating the safety data that identifies location information for one or more other vehicles, a traffic accident, a reduced traffic speed, a collision alert, a status of one or more components of the vehicle, or any combination thereof.

Aspect 24: The method of any of aspects 17 through 23, wherein transmitting the response message includes transmitting the response message indicating the route data that identifies one or more of a map, a speed limit, a road construction alert, road congestion, an alternate route, a road topology, or any combination thereof.

Aspect 25: The method of any of aspects 17 through 24, further comprising: transmitting, to the UE, control signaling indicating a location positioning protocol configuration for reporting, via a sidelink or an access link, one or more information elements in accordance with a location positioning protocol, wherein receiving the message includes: receiving, via the sidelink or the access link, the one or more information elements in accordance with the location positioning protocol configuration, the one or more information elements indicating the location of the vehicle, the one or more vehicle parameters for the vehicle, or both.

Aspect 26: The method of any of aspects 17 through 25, wherein transmitting the response message includes transmitting the response message to a road side unit, the response message instructing the road side unit to forward the route data, the safety data, or both, to the UE.

Aspect 27: The method of any of aspects 17 through 26, wherein the network entity is a base station or a road side unit.

Aspect 28: The method of any of aspects 17 through 27, wherein transmitting the response message includes transmitting the response message via a sidelink or an access link.

Aspect 29: An apparatus for wireless communication at a UE, comprising a processor; memory coupled with the processor; and instructions stored in the memory and executable by the processor to cause the apparatus to perform a method of any of aspects 1 through 16.

Aspect 30: An apparatus for wireless communication at a UE, comprising at least one means for performing a method of any of aspects 1 through 16.

Aspect 31: A non-transitory computer-readable medium storing code for wireless communication at a UE, the code comprising instructions executable by a processor to perform a method of any of aspects 1 through 16.

Aspect 32: An apparatus for wireless communication at a network entity, comprising a processor; memory coupled with the processor; and instructions stored in the memory and executable by the processor to cause the apparatus to perform a method of any of aspects 17 through 28.

Aspect 33: An apparatus for wireless communication at a network entity, comprising at least one means for performing a method of any of aspects 17 through 28.

Aspect 34: A non-transitory computer-readable medium storing code for wireless communication at a network entity, the code comprising instructions executable by a processor to perform a method of any of aspects 17 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   one or more memories coupled with the one or more processors; and
   instructions stored in the one or more memories and executable by the one or more processors to cause the apparatus to:
   identify that the UE has established connectivity with a vehicle;
   obtain one or more vehicle parameters for the vehicle based on the established connectivity with the vehicle, wherein the one or more vehicle parameters include at least one of a vehicle model, a vehicle size, a brake status of the vehicle, a speed of the vehicle, an acceleration of the vehicle, a heading of the vehicle, a yaw of the vehicle, a yaw rate of the vehicle, an engine status of the vehicle, a destination location of the vehicle, or an intended route of the vehicle;
   transmit, to a network entity via a communication link established between the UE and the network entity, a first message indicating a location of the vehicle and the one or more vehicle parameters for the vehicle, wherein the one or more vehicle parameters for the vehicle comprise a set of cellular vehicle-to-everything basic safety message information, wherein the UE is separate from the vehicle, and wherein the communication link is a sidelink or an access link; and receive, based at least in part on the location of the vehicle and the one or more vehicle parameters, a second message indicating route data, safety data, or both.

2. The apparatus of claim 1, wherein transmitting the first message is based at least in part on detected motion of the vehicle by the UE.

3. The apparatus of claim 1, wherein transmitting the first message is based at least in part on wirelessly pairing of the UE with the vehicle, wherein establishing connectivity with the vehicle comprises wirelessly pairing of the UE with the vehicle.

4. The apparatus of claim 1, wherein transmitting the first message is based at least in part on the UE establishing connectivity with the vehicle via a wired connection.

5. The apparatus of claim 1, wherein transmitting the first message is in response to user input indicating that the UE is associated with the vehicle.

6. The apparatus of claim 1, wherein the instructions are further executable by the one or more processors to cause the apparatus to:
transmit a data request to the vehicle; and
receive a data response message indicating at least one vehicle parameter of the one or more vehicle parameters.

7. The apparatus of claim 1, wherein the first message indicating the one or more vehicle parameters comprises one or more static characteristics of the vehicle, wherein the second message is received based at least in part on the one or more static characteristics of the vehicle.

8. The apparatus of claim 7, wherein the one or more static characteristics comprise the vehicle model, the vehicle size, the brake status, or a combination thereof.

9. The apparatus of claim 1, wherein the first message indicating the one or more vehicle parameters comprises one or more dynamic characteristics of the vehicle, wherein the second message is received based at least in part on the one or more dynamic characteristics of the vehicle.

10. The apparatus of claim 9, wherein the one or more dynamic characteristics comprise the speed of the vehicle, the yaw of the vehicle, the yaw rate of the vehicle, the engine status, or a combination thereof.

11. The apparatus of claim 1, wherein the instructions are further executable by the one or more processors to cause the apparatus to:
determine the one or more vehicle parameters comprising the speed of the vehicle in at least one direction, the acceleration of the vehicle in at least one direction, the heading of the vehicle, the destination location of the vehicle, the intended route of the vehicle, or any combination thereof.

12. The apparatus of claim 1, wherein the second message indicating the safety data comprises location information for one or more other vehicles, a traffic accident, a reduced traffic speed, a collision alert, a status of one or more components of the vehicle, or any combination thereof.

13. The apparatus of claim 1, wherein the second message indicating the route data comprises one or more of a map, a speed limit, a road construction alert, road congestion, an alternate route, a road topology, or any combination thereof.

14. The apparatus of claim 1, wherein the instructions are further executable by the one or more processors to cause the apparatus to:

receive, from the network entity, control signaling indicating a location positioning protocol configuration for reporting, via the communication link, one or more information elements in accordance with a location positioning protocol; and
transmit, via the sidelink or the access link, the one or more information elements in accordance with the location positioning protocol configuration, the one or more information elements indicating the location of the vehicle, the one or more vehicle parameters for the vehicle, or both.

15. The apparatus of claim 1, wherein the network entity is a base station or a road side unit.

16. The apparatus of claim 1, wherein receiving the second message is via the sidelink, a second sidelink, the access link, or a second access link.

17. An apparatus for wireless communication at a network entity, comprising:
one or more processors;
one or more memories coupled with the one or more processors; and
instructions stored in the one or more memories and executable by the one or more processors to cause the apparatus to:
receive, from a user equipment (UE) via a communication link established between the UE and the network entity, a message indicating one or more vehicle parameters for a vehicle associated with the UE and a location of the vehicle, wherein the UE is separate from the vehicle, wherein the one or more vehicle parameters are obtained by the UE based on an established connectivity between the UE and the vehicle, wherein the communication link is a sidelink or an access link, wherein the one or more vehicle parameters for the vehicle include at least one of a vehicle model, a vehicle size, a brake status of the vehicle, a speed of the vehicle, an acceleration of the vehicle, a heading of the vehicle, a yaw of the vehicle, a yaw rate of the vehicle, an engine status of the vehicle, a destination location of the vehicle, or an intended route of the vehicle, and wherein the one or more vehicle parameters for the vehicle comprise a set of cellular vehicle-to-everything basic safety message information;
identify route data, safety data, or both, based at least in part on the location of the vehicle and the one or more vehicle parameters; and
transmit, to the UE, a response message comprising the route data, the safety data, or both.

18. The apparatus of claim 17, wherein the message indicating the one or more vehicle parameters comprises one or more static characteristics of the vehicle, wherein the response message is transmitted based at least in part on the one or more static characteristics of the vehicle.

19. The apparatus of claim 18, wherein the one or more static characteristics comprise the vehicle model, the vehicle size, the brake status, or a combination thereof.

20. The apparatus of claim 17, wherein the message indicating the one or more vehicle parameters comprises one or more dynamic characteristics of the vehicle, wherein the response message is transmitted based at least in part on the one or more dynamic characteristics of the vehicle.

21. The apparatus of claim 20, wherein the one or more dynamic characteristics comprise the speed of the vehicle, the yaw of the vehicle, the yaw rate of the vehicle, the engine status, or a combination thereof.

22. The apparatus of claim 17, wherein the message indicates that the UE determined the one or more vehicle parameters comprising the speed of the vehicle in at least one direction, the acceleration of the vehicle in at least one direction, the heading of the vehicle, the destination location of the vehicle, the intended route of the vehicle, or any combination thereof.

23. The apparatus of claim 17, wherein the response message indicating the safety data comprises location information for one or more other vehicles, a traffic accident, a reduced traffic speed, a collision alert, a status of one or more components of the vehicle, or any combination thereof.

24. The apparatus of claim 17, wherein the response message indicating the route data comprises one or more of a map, a speed limit, a road construction alert, road congestion, an alternate route, a road topology, or any combination thereof.

25. The apparatus of claim 17, wherein the instructions are further executable by the one or more processors to cause the apparatus to:
    transmit, to the UE, control signaling indicating a location positioning protocol configuration for reporting, via the sidelink or the access link, one or more information elements in accordance with a location positioning protocol; and
    receive, via the sidelink or the access link, the one or more information elements in accordance with the location positioning protocol configuration, the one or more information elements indicating the location of the vehicle, the one or more vehicle parameters for the vehicle, or both.

26. The apparatus of claim 17, wherein the instructions are further executable by the one or more processors to cause the apparatus to:
    transmit the response message to a road side unit, the response message instructing the road side unit to forward the route data, the safety data, or both, to the UE.

27. The apparatus of claim 17, wherein the network entity is a base station or a road side unit.

28. The apparatus of claim 17, wherein transmitting the response message is via the sidelink or the access link.

29. A method for wireless communication at a user equipment (UE), comprising:
    identifying that the UE has established connectivity with a vehicle;
    obtaining one or more vehicle parameters for the vehicle based on the established connectivity with the vehicle, wherein the one or more vehicle parameters include at least one of a vehicle model, a vehicle size, a brake status of the vehicle, a speed of the vehicle, an acceleration of the vehicle, a heading of the vehicle, a yaw of the vehicle, a yaw rate of the vehicle, an engine status of the vehicle, a destination location of the vehicle, or an intended route of the vehicle;
    transmitting, to a network entity via a communication link established between the UE and the network entity, a first message indicating a location of the vehicle and the one or more vehicle parameters for the vehicle, wherein the one or more vehicle parameters for the vehicle comprise a set of cellular vehicle-to-everything basic safety message information, wherein the UE is separate from the vehicle, and wherein the communication link is a sidelink or an access link; and
    receiving, based at least in part on the location of the vehicle and the one or more vehicle parameters, a second message indicating route data, safety data, or both.

30. A method for wireless communication at a network entity, comprising:
    receiving, from a user equipment (UE) via a communication link established between the UE and the network entity, a message indicating one or more vehicle parameters for a vehicle associated with the UE and a location of the vehicle, wherein the UE is separate from the vehicle, wherein the one or more vehicle parameters are obtained by the UE based on an established connectivity between the UE and the vehicle, wherein the communication link is a sidelink or an access link, wherein the one or more vehicle parameters for the vehicle include at least one of a vehicle model, a vehicle size, a brake status of the vehicle, a speed of the vehicle, an acceleration of the vehicle, a heading of the vehicle, a yaw of the vehicle, a yaw rate of the vehicle, an engine status of the vehicle, a destination location of the vehicle, or an intended route of the vehicle, and wherein the one or more vehicle parameters for the vehicle comprise a set of cellular vehicle-to-everything basic safety message information;
    identifying route data, safety data, or both, based at least in part on the location of the vehicle and the one or more vehicle parameters; and
    transmitting, to the UE, a response message comprising the route data, the safety data, or both.

* * * * *